(12) United States Patent
Orozco et al.

(10) Patent No.: US 9,935,934 B1
(45) Date of Patent: Apr. 3, 2018

(54) TOKEN MANAGEMENT

(71) Applicant: MicroStrategy Incorporated, Vienna, VA (US)

(72) Inventors: Luis Orozco, Vienna, VA (US); Gie Kian Siauw, Hangzhou (CN)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 14/674,943

(22) Filed: Mar. 31, 2015

Related U.S. Application Data

(60) Provisional application No. 61/972,868, filed on Mar. 31, 2014.

(51) Int. Cl.
  *H04L 29/06* (2006.01)
  *H04L 9/32* (2006.01)

(52) U.S. Cl.
  CPC ........ *H04L 63/0807* (2013.01); *H04L 9/3213* (2013.01); *H04L 63/0815* (2013.01); *H04L 63/10* (2013.01)

(58) Field of Classification Search
  CPC .......................... H04L 63/0807; H04L 9/3213
  See application file for complete search history.

(56) References Cited

U.S. PATENT DOCUMENTS

| | | | | |
|---|---|---|---|---|
| 8,533,796 B1* | 9/2013 | Shenoy | ............... | H04L 63/0815 380/229 |
| 8,607,067 B1* | 12/2013 | Janse van Rensburg | ............ | H04L 63/0823 713/189 |
| 8,683,560 B1* | 3/2014 | Brooker | .................. | H04L 63/08 713/155 |
| 8,800,009 B1* | 8/2014 | Beda, III | ............ | H04L 63/0846 713/155 |
| 8,856,891 B2 | 10/2014 | Whitcomb | | |
| 8,869,256 B2* | 10/2014 | Sample | ............... | H04L 12/5835 726/5 |
| 9,065,817 B2* | 6/2015 | Bailey | ..................... | G06F 21/41 |
| 9,225,707 B1* | 12/2015 | de Sousa | ................ | H04L 63/08 |
| 2008/0098465 A1* | 4/2008 | Ramakrishna | .......... | G06F 21/10 726/5 |

(Continued)

OTHER PUBLICATIONS

Kappes, Martin; Krishnan, P.; "Content Authentication in Enterprises for Mobile Devices", IEEE/Sarnoff Symposium on Advances in Wired and Wireless Communication, Apr. 26-27, 2004, pp. 127-129.*

(Continued)

*Primary Examiner* — Victor Lesniewski
(74) *Attorney, Agent, or Firm* — Fish & Richardson P.C.

(57) ABSTRACT

A method and system for management access tokens is described. Access tokens for accessing third-party resources are stored and managed in a token repository. An access token may be obtained from a third-party resource. Once a user has authorized the system to access a third-party resource and unless that authorization is revoked, the user is not required to reauthorize the system in a pending or any subsequent interactive session, regardless of which shard of the system and third-party resource the user is connected to. The system can also use the authorization to execute scheduled requests for accessing or obtaining data from the third-party resource.

20 Claims, 30 Drawing Sheets

(56) References Cited

U.S. PATENT DOCUMENTS

| | | | |
|---|---|---|---|
| 2008/0301770 A1* | 12/2008 | Kinder | H04L 63/0823 726/2 |
| 2011/0119747 A1* | 5/2011 | Lambiase | G06F 21/335 726/8 |
| 2011/0265147 A1 | 10/2011 | Liu | |
| 2013/0326507 A1* | 12/2013 | McGrath | G06F 9/4856 718/1 |
| 2014/0373126 A1* | 12/2014 | Hussain | H04L 63/08 726/9 |
| 2015/0074060 A1* | 3/2015 | Varadharajan | G06F 3/0481 707/649 |
| 2015/0089623 A1* | 3/2015 | Sondhi | H04L 63/08 726/9 |
| 2015/0121462 A1* | 4/2015 | Courage | H04L 63/08 726/4 |
| 2015/0160956 A1* | 6/2015 | Shah | H04L 63/10 718/1 |
| 2015/0268982 A1* | 9/2015 | Eisenmann | G06F 9/45558 718/1 |

OTHER PUBLICATIONS

Murukutla, Pratap; Shet, K.C.; "Single Sign on for Cloud", International Conference on Computing Sciences (ICCS), IEEE, Sep. 14-15, 2012, pp. 176-179.*

* cited by examiner

TOKEN MANAGEMENT

CROSS REFERENCE TO RELATED APPLICATION

This application claims the benefit of U.S. provisional patent application No. 61/972,868, filed on Mar. 31, 2014, which is incorporated by reference herein.

FIELD

This disclosure generally relates to token management in an intelligence system.

BACKGROUND

As use of the Internet grows, platforms providing access to multiple third-party systems are being developed. However, users may experience difficulties and inconveniences while using such platforms because the user has to enter credentials for each third-party system every time the user would like to initially access a respective third-party system.

SUMMARY

This disclosure may assist in addressing the user difficulties and inconveniences noted above through a method and system for token management in an intelligence system.

Innovative aspects of the subject matter described in this specification may, in some implementations, be embodied in a computer-implemented method that includes actions of receiving user identification information identifying a user, selecting, from a plurality of shards, a shard in response to receiving the user identification information, storing, in a token repository, a mapping of information identifying the selected shard to the user identification information identifying the user, and receiving a request to access a third-party resource without receiving, from the user, credentials for accessing the third-party resource. In response to receiving the request to access the third-party resource without receiving, from the user, credentials for accessing the third-party resource, determining whether the credentials for accessing the third-party resource are cached in the selected shard. In response to determining that the credentials for accessing the third-party resource are cached in the selected shard, providing access to the third-party resource for the user using the selected shard and a third-party resource access token that provides access to the third-party resource. In response to determining that the credentials for accessing the third-party resource are not cached in the selected shard, determining whether information identifying accounts associated with the user is stored in the token repository. The accounts associated with the user include user accounts that utilize shards other than the selected shard. In response to determining that information identifying accounts associated with the user is not stored in the token repository, the third-party resource access token that provides access to the third-party resource is obtained from the third-party resource. The actions also include storing, as part of the mapping in the token repository, a mapping of the third-party resource access token to the user identification information identifying the user and the selected shard, and providing access to the third-party resource for the user using the selected shard and the third-party resource access token that provides access to the third-party resource.

In some implementations, a system includes one or more computers and one or more storage devices storing instructions that are operable and when executed by the one or more computers, cause the one or more computers to perform actions. The actions include receiving user identification information identifying a user, selecting, from a plurality of shards, a shard in response to receiving the user identification information, storing, in a token repository, a mapping of information identifying the selected shard to the user identification information identifying the user, and receiving a request to access a third-party resource without receiving, from the user, credentials for accessing the third-party resource. In response to receiving the request to access the third-party resource without receiving, from the user, credentials for accessing the third-party resource, determining whether the credentials for accessing the third-party resource are cached in the selected shard. In response to determining that the credentials for accessing the third-party resource are cached in the selected shard, providing access to the third-party resource for the user using the selected shard and a third-party resource access token that provides access to the third-party resource. In response to determining that the credentials for accessing the third-party resource are not cached in the selected shard, determining whether information identifying accounts associated with the user is stored in the token repository. The accounts associated with the user include user accounts that utilize shards other than the selected shard. In response to determining that information identifying accounts associated with the user is not stored in the token repository, the third-party resource access token that provides access to the third-party resource is obtained from the third-party resource. The actions also include storing, as part of the mapping in the token repository, a mapping of the third-party resource access token to the user identification information identifying the user and the selected shard, and providing access to the third-party resource for the user using the selected shard and the third-party resource access token that provides access to the third-party resource.

In some implementations, a non-transitory computer-readable storage medium is provided and includes instructions, which, when executed by one or more computers, cause the one or more computers to perform actions. The actions include receiving user identification information identifying a user, selecting, from a plurality of shards, a shard in response to receiving the user identification information, storing, in a token repository, a mapping of information identifying the selected shard to the user identification information identifying the user, and receiving a request to access a third-party resource without receiving, from the user, credentials for accessing the third-party resource. In response to receiving the request to access the third-party resource without receiving, from the user, credentials for accessing the third-party resource, determining whether the credentials for accessing the third-party resource are cached in the selected shard. In response to determining that the credentials for accessing the third-party resource are cached in the selected shard, providing access to the third-party resource for the user using the selected shard and a third-party resource access token that provides access to the third-party resource. In response to determining that the credentials for accessing the third-party resource are not cached in the selected shard, determining whether information identifying accounts associated with the user is stored in the token repository. The accounts associated with the user include user accounts that utilize shards other than the selected shard. In response to determining that information identifying accounts associated with the user is not stored in the token repository, the third-party resource access token that provides access to the third-party resource is obtained from the third-party resource. The actions also include storing, as part of the mapping in the token repository, a mapping of the third-party resource access token to the user identification information identifying the user and the selected shard, and providing access to the third-party resource for the user using the selected shard and the third-party resource access token that provides access to the third-party resource.

Other implementations include corresponding systems, apparatuses, and computer programs, configured to perform the above-noted actions, encoded on computer storage devices.

These and other implementations may each optionally include one or more of the following features. For instance, the implementations further include actions of in response to determining that the information identifying accounts associated with the user is stored in the token repository: obtaining, from the information that is stored in the token repository and that identifies accounts associated with the user, the credentials for accessing the third-party resource; and caching, in the selected shard, the credentials for accessing the third-party resource obtained from the token repository. Providing access for the third-party resource to the user using the selected shard and a third-party resource access token that provides access to the third-party resource includes obtaining the third-party resource access token from the selected shard. Selecting, from a plurality of shards, a shard includes: determining whether at least a portion of a shard is mapped to the user; and in response to determining that the at least the portion of the shard is mapped to the user, selecting the same portion of the shard for the user. Selecting, from a plurality of shards, a shard includes: determining that a shard has an access capacity that satisfies a particular threshold; and selecting the shard that has the access capacity that satisfies the particular threshold. Selecting, from a plurality of shards, a shard includes: determining that the user has been invited by a second user to access the third-party resource; determining a shard that is mapped to the second user; and selecting, for the user, the shard that is mapped to the second user. Receiving a request to access a third-party resource includes one of: receiving a request from the user to access the third-party resource; and receiving a request generated by a processor to access the third-party resource according to a determined schedule associated with the user. Obtaining, from the third-party resource, the third-party resource access token that provides access to the third-party resource includes: executing an open authentication protocol with third-party resource; receiving, from the third-party resource, the third-party resource access token that provides access for the third-party resource; storing the received third-party resource access token in the token repository; and caching the received third-party resource access token in the selected shard. The credentials for accessing the third-party resource include the third-party resource access token. Providing access to the third-party resource includes: obtaining data associated with the user from the third-party resource; and generating a graphical user interface configured to display at least a portion of the obtained data. The actions further include receiving data indicating that access, for the user, to the third-party resource is revoked; and in response to receiving the data indicating that access, for the user, to the third-party resource is revoked, transmitting a message indicating that the user is not authorized to access the third-party resource. The stored mapping includes an expiration time threshold of the third-party resource access token; the third-party resource access token provides access to all third-party resources associated with the user; and each shard in the plurality of shards is configured to process data transceived to and from a different third-party resource. The actions further include revoking access of the user to the third-party resource in response to determining that a time duration of user access to the third-party resource satisfies the expiration time threshold of the third-party resource access token. The actions further include determining whether a user session for accessing the third-party resource has been terminated; and in response to determining that the user session for accessing the third-party resource has been terminated, maintaining, in a cache of the selected shard, the third-party resource access token.

BRIEF DESCRIPTION OF THE DRAWINGS

Like reference numbers and designations in the various drawings indicate like elements.

DETAILED DESCRIPTION

A method and Intelligence System (hereinafter referred to as "IS") for automatic management of Open Authentication (OAuth) access tokens is described. Access tokens for accessing third-party resources are stored and managed in a token repository. The IS may obtain an access token from a third-party resource using OAuth. Once a user has authorized the IS to access a third-party resource and unless that authorization is revoked, the user is not required to reauthorize the IS in a pending or any subsequent interactive session, regardless of which shard of the IS and third-party resource to which the user is connected. The IS can also use the authorization to execute scheduled requests for accessing or obtaining data from the third-party resource.

When authorization to access a third-party resource is revoked, any access tokens in the token repository or cached in the shards are removed, and subsequent interactive and scheduled operations will fail unless the user reauthorizes the IS. Implementations of the method and IS for automatic management of access tokens include reauthorization of the IS by the user to access a third-party resource.

Open Authentication (OAuth) is an open standard for delegated authorization. OAuth generally allows clients to access server resources on behalf of a resource owner without requiring the resource owner to share the resource owner's credentials with the client. In the IS, OAuth may be used in two scenarios. The first scenario is an interactive scenario in which a user may import data from a third-party resource, such as a web service system, and publish a report based on the imported data. The second scenario is a scheduled scenario in which the user may schedule a previously-published report based on the imported data to be updated and/or republished at a scheduled time in the future on a recurring or non-recurring basis.

The OAuth standard utilizes access tokens. An access token is obtained as a result of an OAuth process, and is a "key" that allows IS to access a third-party resource on behalf of the user. In the first (interactive) scenario, the user first authorizes the IS using the OAuth protocol, which results in a third-party system returning an access token to the IS. The IS stores the access token and is subsequently allowed to access and import data from the third-party system. In the scheduled scenario, a user may not be connected or logged in to the IS, but the IS may utilize an access token obtained during a previous authorization process to access the third-party system.

Hereinafter, exemplary implementations of a method and IS for automatic management of access tokens are described.

Figure 1A:
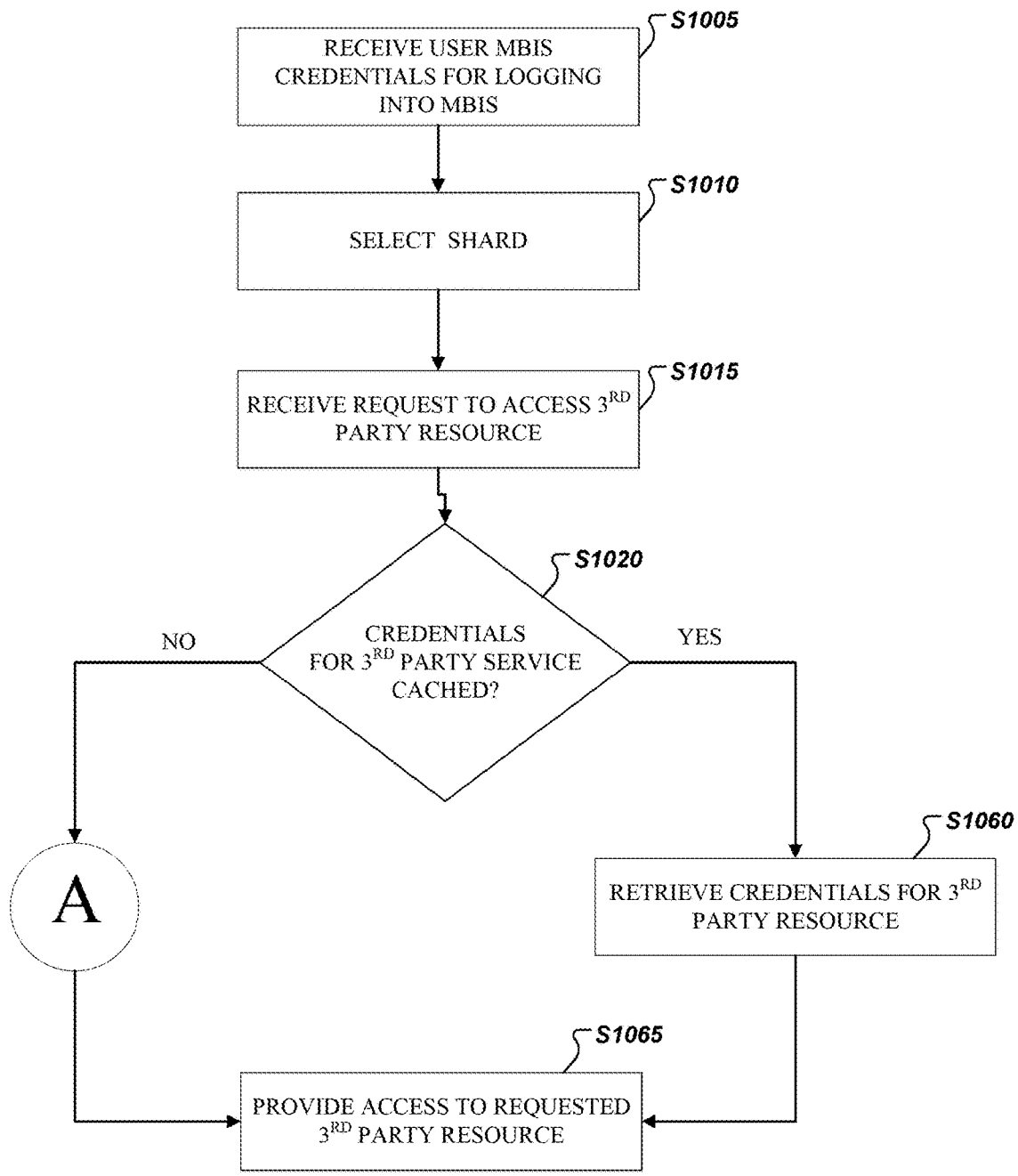
FIGS. 1A and 1B illustrate an exemplary method for automatic management of access tokens in an intelligence system.
Figure 1B:
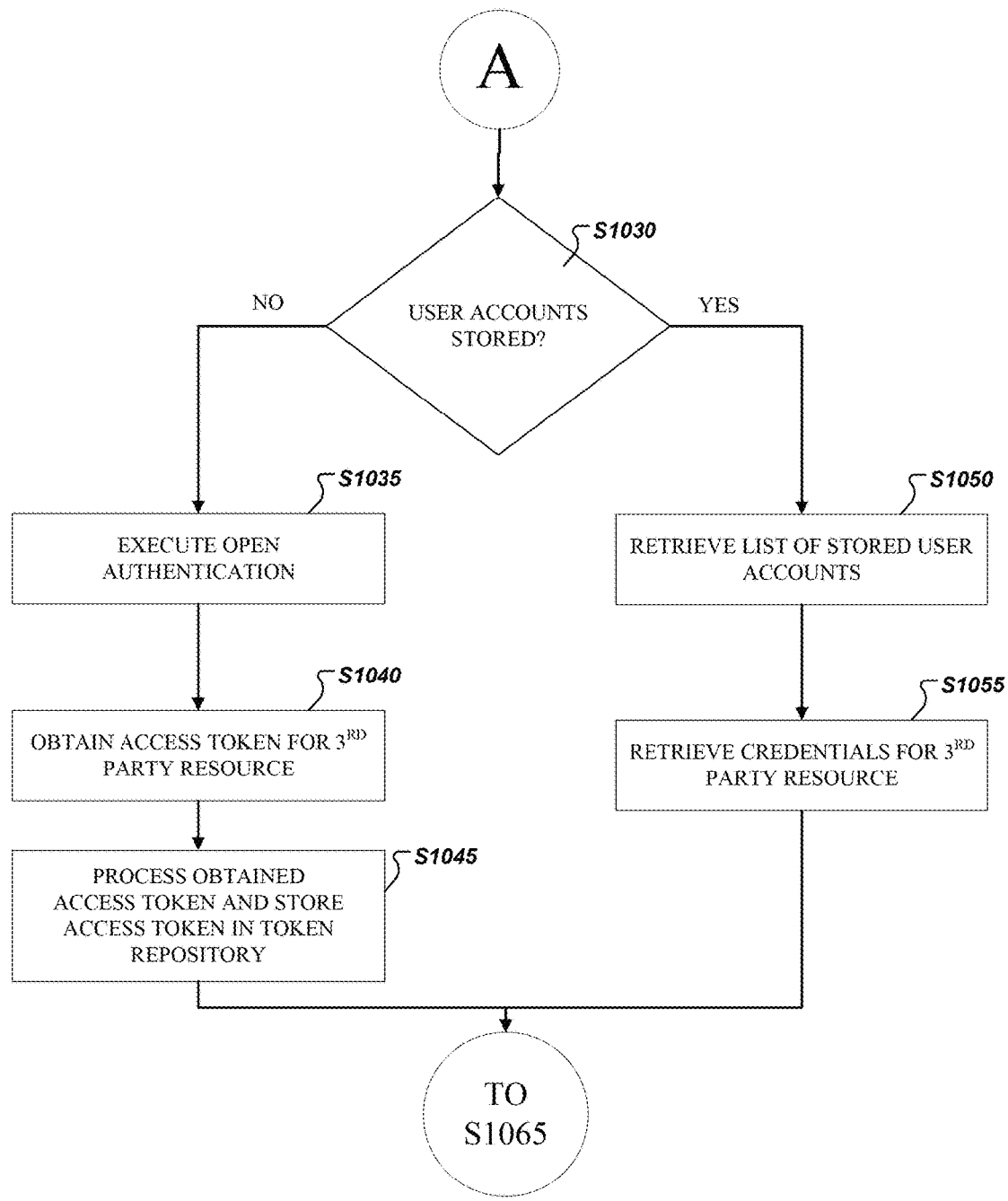
Figure 2:
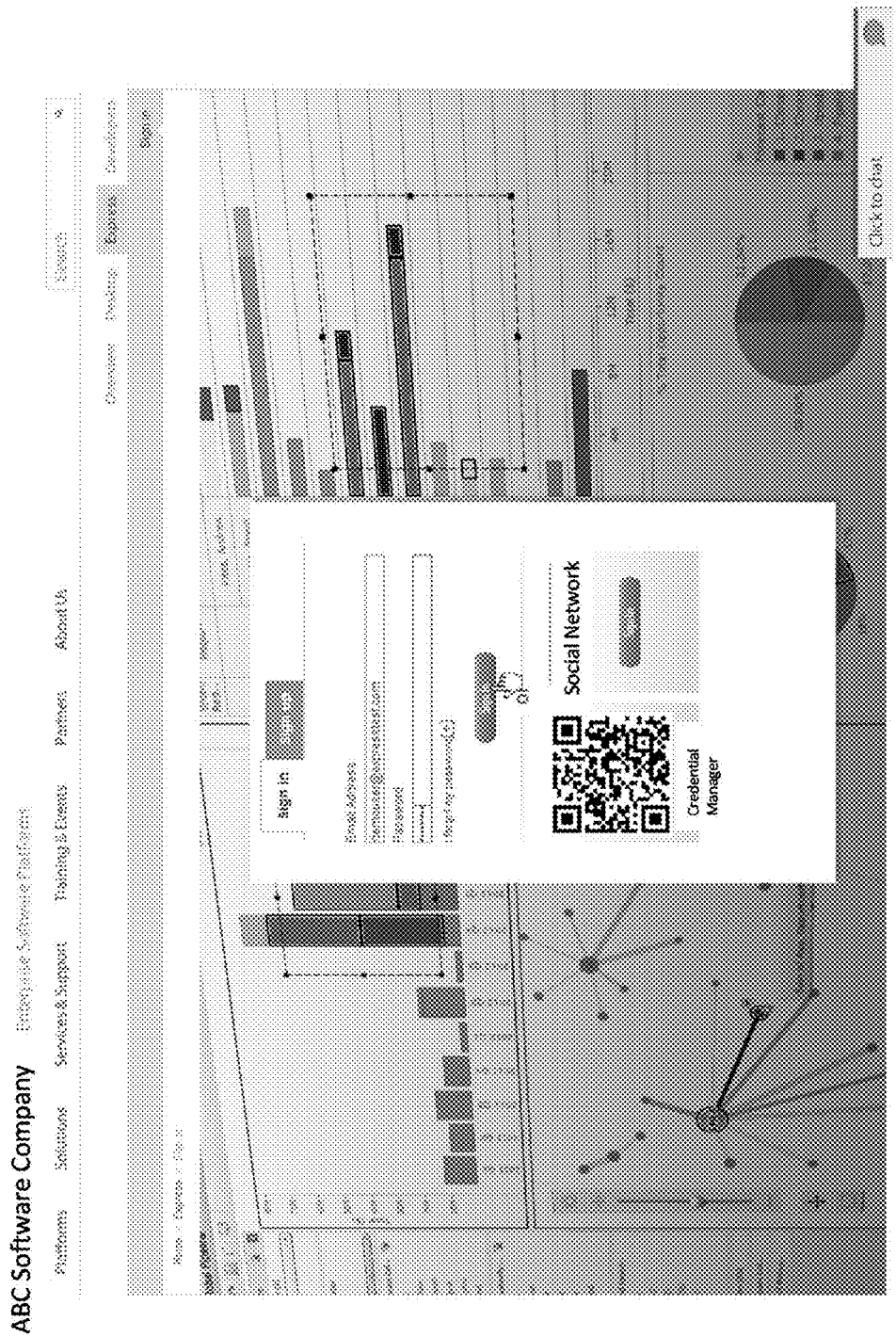
FIG. 2 is an exemplary user interface of a log in screen to access an intelligence system.

Referring to FIGS. 1A and 1B, the IS may receive the user's IS credentials from the user when the user would like to access the IS (S1005). As shown in FIG. 2, in some implementations, when the user would like to access the IS, the IS may cause a user device to display a graphical user interface through which a user may log into the IS using a username and password that is specific for the user. The user device may display the graphical user interface by accessing a web portal for the IS or after an IS application, software, or process is installed and executed in the user device. In some implementations, the user may provide credentials for other systems, such as a social network or a credential manager, to authenticate the user to the IS.

After receiving the user's credentials, the IS selects a shard from a plurality of shards to associate with the user's session (S1010). Various suitable methods may be used to select a shard to associate with the user. In some implementations, the IS utilizes a load balancer to determine which shard among the plurality of shards of the IS has the least amount of data traffic. The shard with the least amount of data traffic may be selected.

In some implementations, the IS utilizes the load balancer to determine which shard among the plurality of shards has an access capacity that satisfies a particular access capacity threshold. The access capacity threshold may be configured by an administrator of the IS. A shard that satisfies the access capacity threshold may be selected by the IS. In some cases, a shard that satisfies the access capacity threshold by the largest margin is selected. In some cases, any shard that satisfies the access capacity threshold may be selected.

In some implementations, the IS looks up a mapping table to determine whether a shard has been previously mapped to the user whose credentials have been received. If a shard or a portion of a shard has been previously mapped to the user, the same shard or portion of the shard is selected by the IS.

In some cases, the user may have been invited to utilize the IS or a particular third-party resource by another user. Accordingly, if the user arrives at the IS through an invitation from another user, after receiving the user's credentials, the IS may determine an identity of the other user and determine whether a shard has been mapped to the other user. If the other user is mapped to a shard, the IS will select the same shard for both users. The IS may extract the other user's identification information from the invitation sent to the user. Various suitable types of invitations may be used, including, for example, an email or link directing the user to the IS or particular third-party resource.

Figure 3:
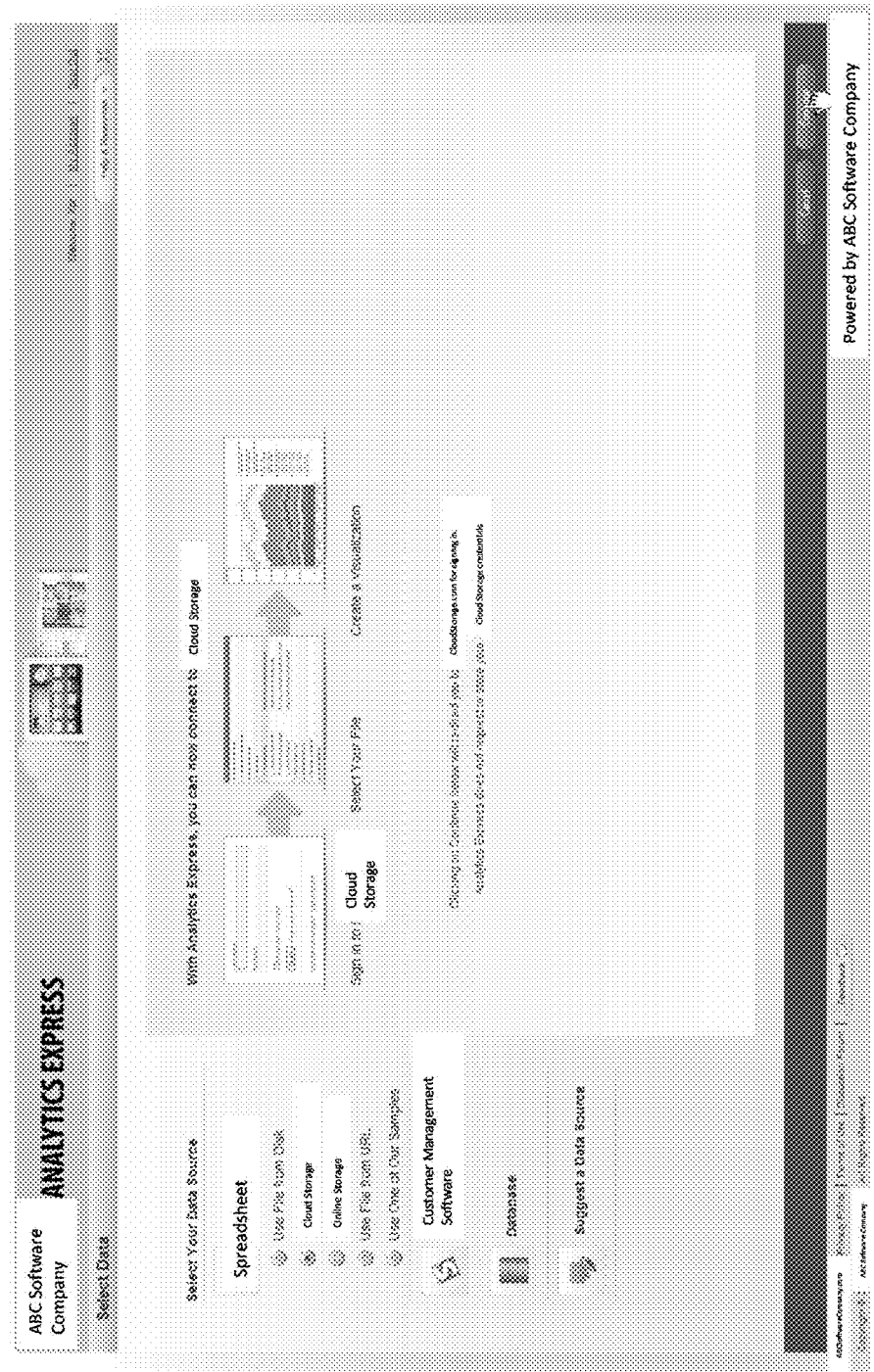
FIG. 3 is an exemplary user interface of an intelligence system for receiving a user selection of a third-party resource.

In some implementations, after selecting a shard for the user according to any one of the various methods described above, the IS may store a mapping of information identifying the selected shard to identification information identifying the user. This mapping may be stored in a token repository. Identification information identifying the user may include various types of identification data associated with the user including one or more of, for example, a user login id, a registered name or avatar of the user, and an Internet Protocol and/or Media Access Control (MAC) address associated with the user, After selecting a shard for the user according to any one of the various methods described above and/or storing the mapping as noted above, the IS may receive a request from the user to access a third-party resource (S1015). For example, as shown in FIG. 3, the user may select a third-party resource (e.g., data source) from which the IS can access data. The user may select from various third-party resources, such as a "Cloud Storage," "Online Storage," a file from a disk, a file from a Uniform Resource Locator (URL), etc. In some cases, the user may also access data from a customer management software database, or another database suggested by the user or the IS. In FIG. 3, the user selects "Cloud Storage" as the third-party resource from which the user would like to access data. The IS receives a request (e.g., user selection) indicating that the user would like to access data from the "Cloud Storage" third-party resource. In some cases, the request to access a third-party resource is received from the user without receiving credentials for accessing the third-party resource from the user.

After receiving a request to access a third-party resource, the IS determines whether credentials for the third-party resource are cached in the selected shard (S1020). If credentials for the third-party resource are cached in the selected shard, then the IS retrieves the cached credentials from the shard (S1060) and provides access to the third-party resource (S1065). The credentials for the third-party resource include an access token that provides access to the third-party resource, and may include one or more of a login username and password of the user for the third-party resource, and any other data that provides the IS with access to the third-party resource.

As shown in FIG. 1B, if the IS determines that no credentials for the third-party resource are cached in the selected shard, then the IS determines whether a list of accounts associated with the user is stored in the token repository (S1030). In some implementations, the token repository resembles a two-level map. In the first level, the IS user identification information (obtained from the received IS user credentials) and a database role identification information that identifies the third-party resource is used to determine the user's account identification in the third-party resource. In the second level, the database role identification and the user account identification in the third-party resource, which was obtained in the first level, may be used to determine credentials in the third-party resource for a user account.

If the IS determines that a list of accounts associated with the user is stored in the token repository, the IS retrieves the list of stored accounts associated with the user (S1050), retrieves the credentials for the third-party resource from the token repository as described above (S1055), and provides access to the third-party resource (S1065). In some implementations, the retrieved credentials for accessing the third-party resource may subsequently be cached in the shard selected for the ongoing IS session of the user.

Figure 4:
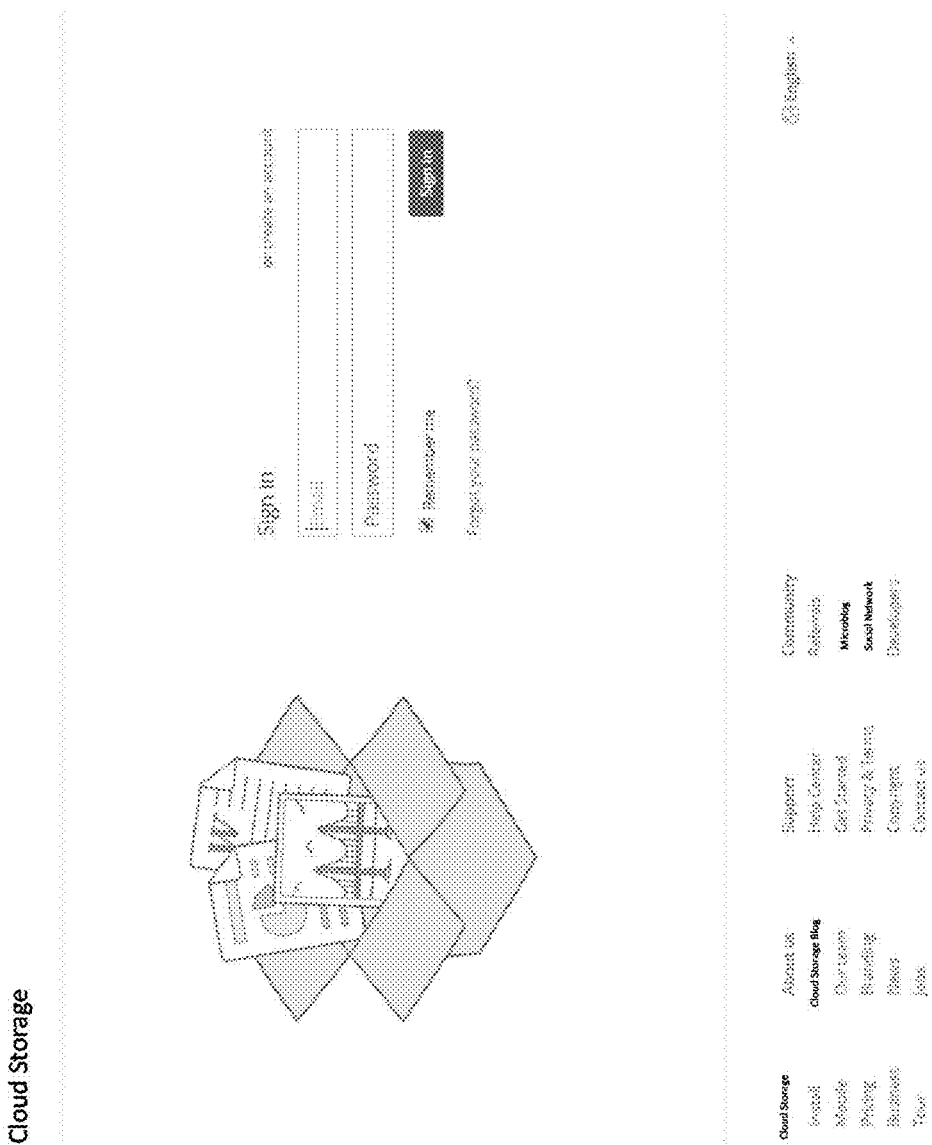
FIGS. 4 and 5 are exemplary user interfaces of an intelligence system for receiving user credentials for a third-party resource.
Figure 5:
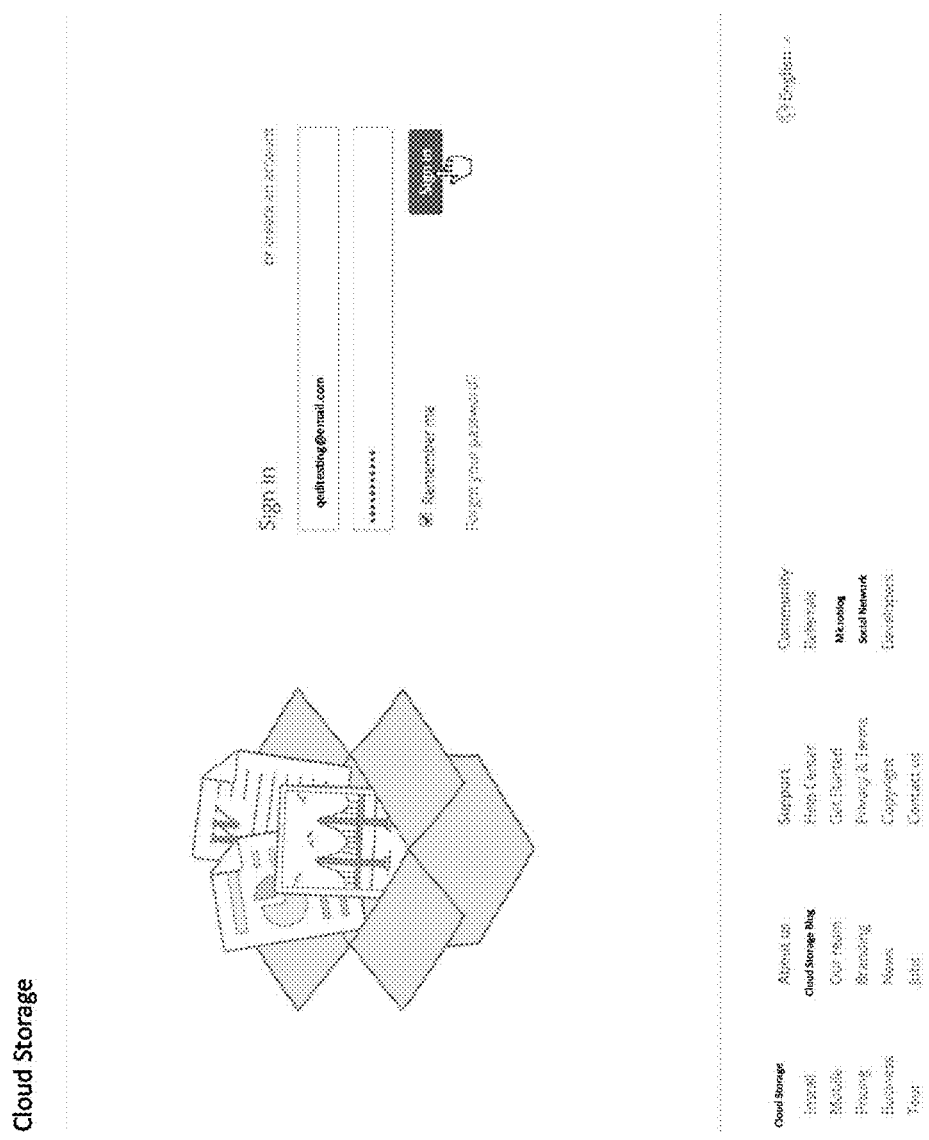

If the IS determines that a list of accounts associated with the user is not stored in the token repository, then the IS begins a token management process. At the beginning of the token management process, the third-party resource may prompt the user for the user's credentials (e.g., username, password) for the third-party resource through a graphical user interface displayed on the user's device, as shown in FIG. 4. After entering the user's credentials as shown in FIG. 5, if the user's credentials are successfully authenticated, then the user is logged into the third-party resource and an OAuth process is executed (S1035) to obtain an access token for the third-party resource (S1040). For example, using OAuth, the third party resource returns an access token to a IS web server. The IS will subsequently process the obtained access token (S1045). For example, the IS web server may pass the access token to the IS intelligence server, which caches the access token in the token repository for future access to the third-party resource. After processing the access token, the IS provides access to the third-party resource to the user (S1065).

Figure 6:
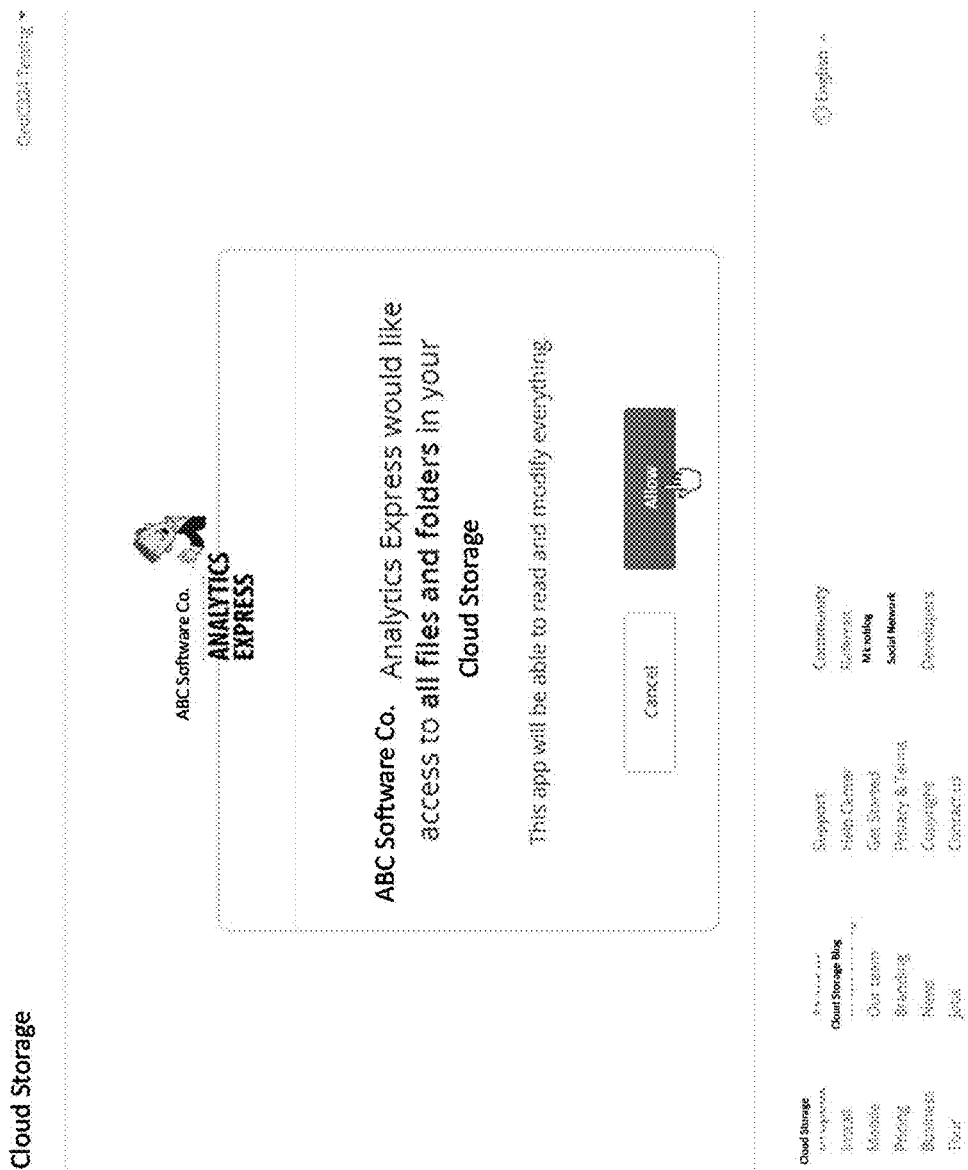
FIG. 6 is an exemplary user interface for receiving permission from the user to access third-party resource for an intelligence system.
Figure 7:
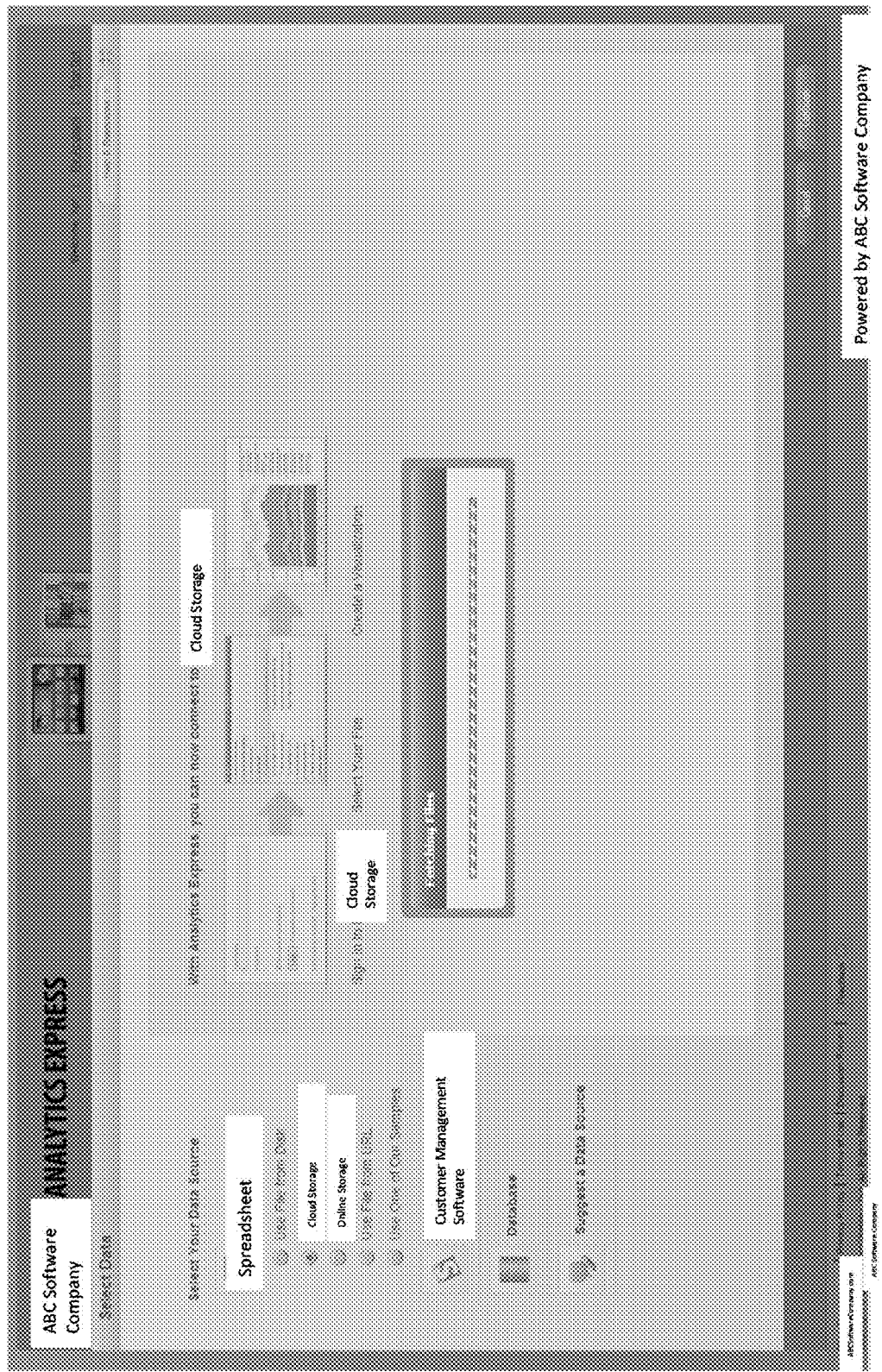
FIGS. 7-12 are exemplary user interfaces for accessing data from a third-party resource in an intelligence system.
Figure 8:
Figure 9:
Figure 10:
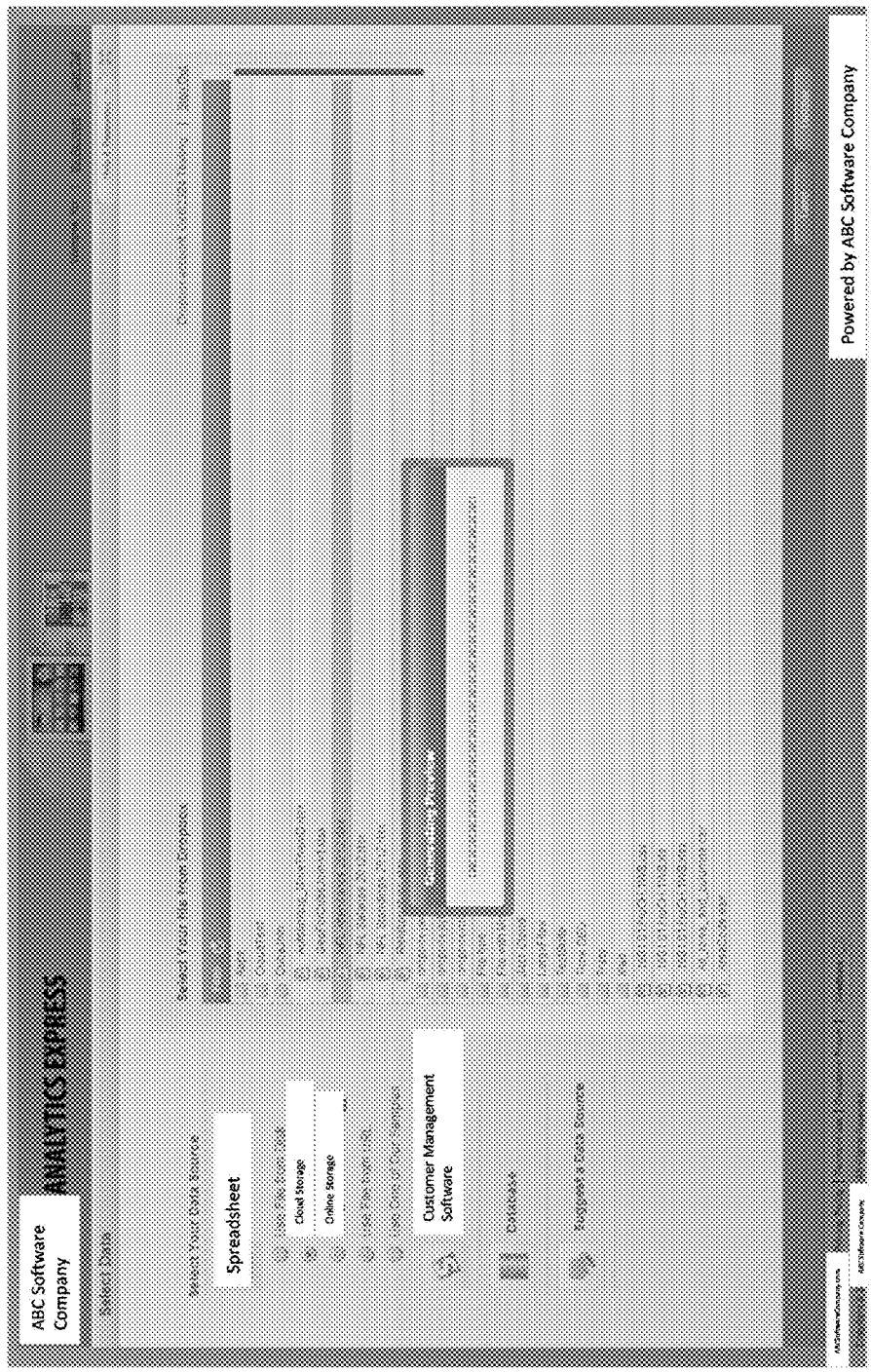
Figure 11:
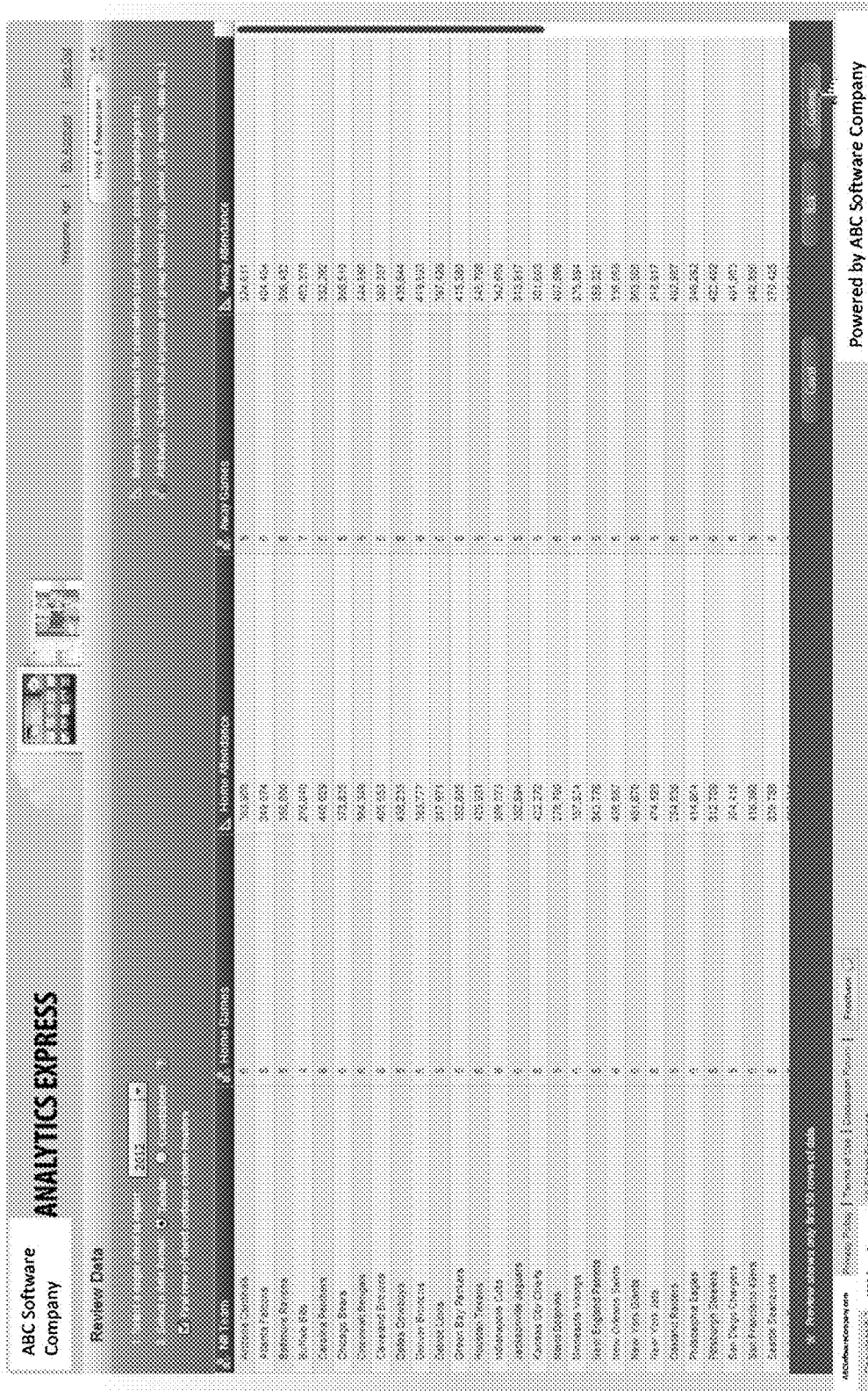
Figure 12:
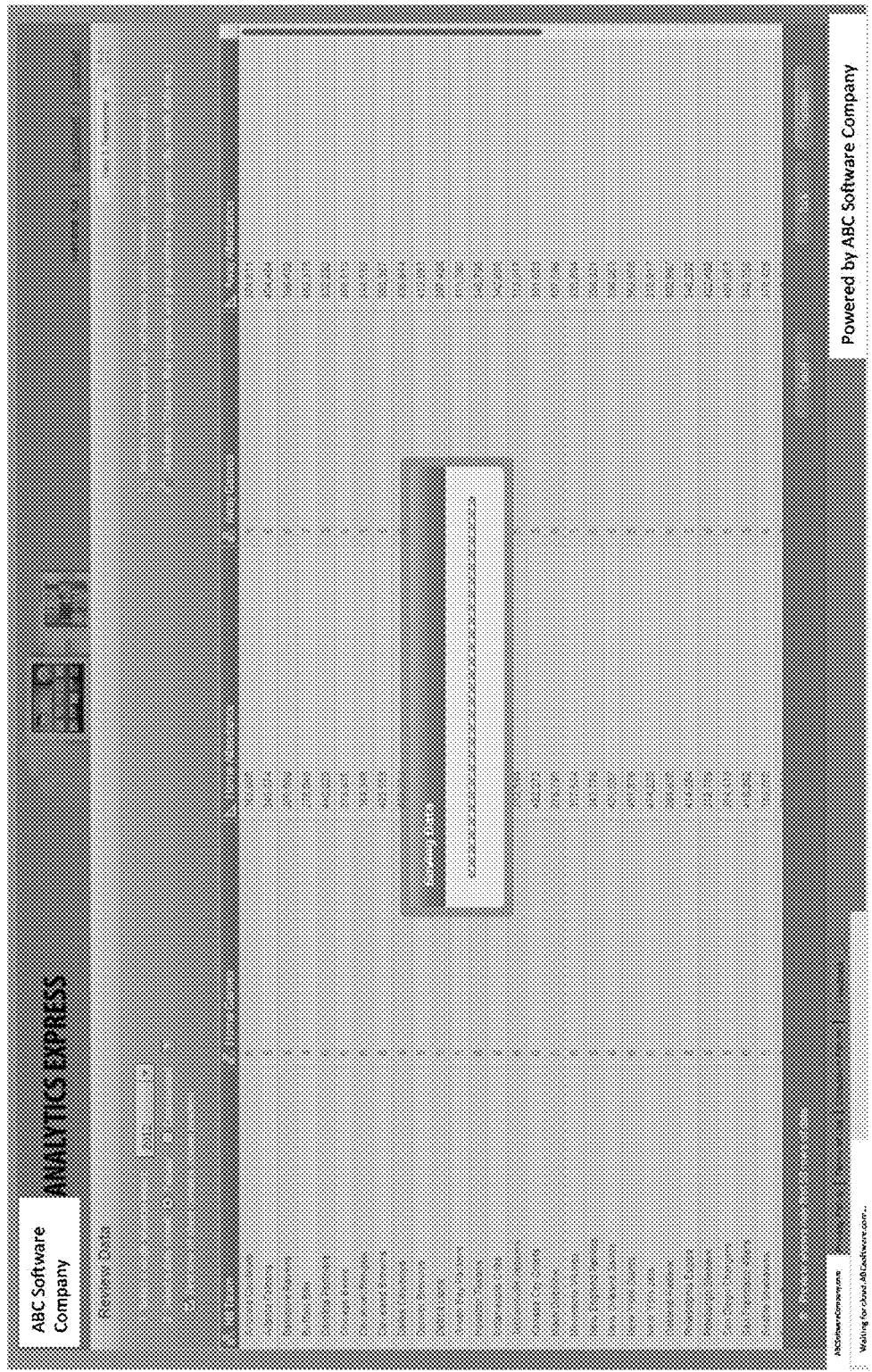
Figure 13:
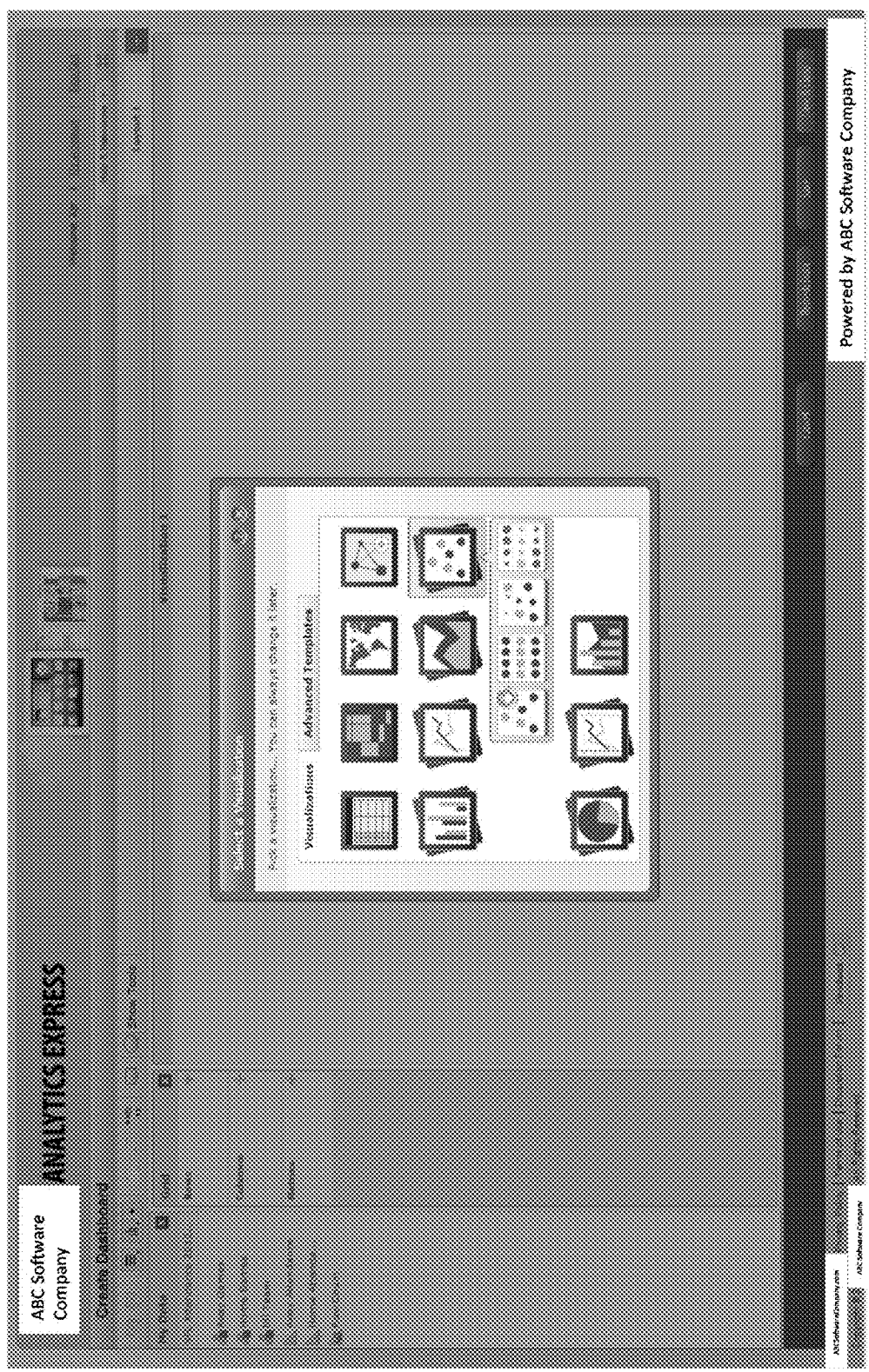
FIGS. 13, 14, 25, and 26 illustrate exemplary user interfaces for selecting a visualization for the selected data from a third-party resource.
Figure 14:
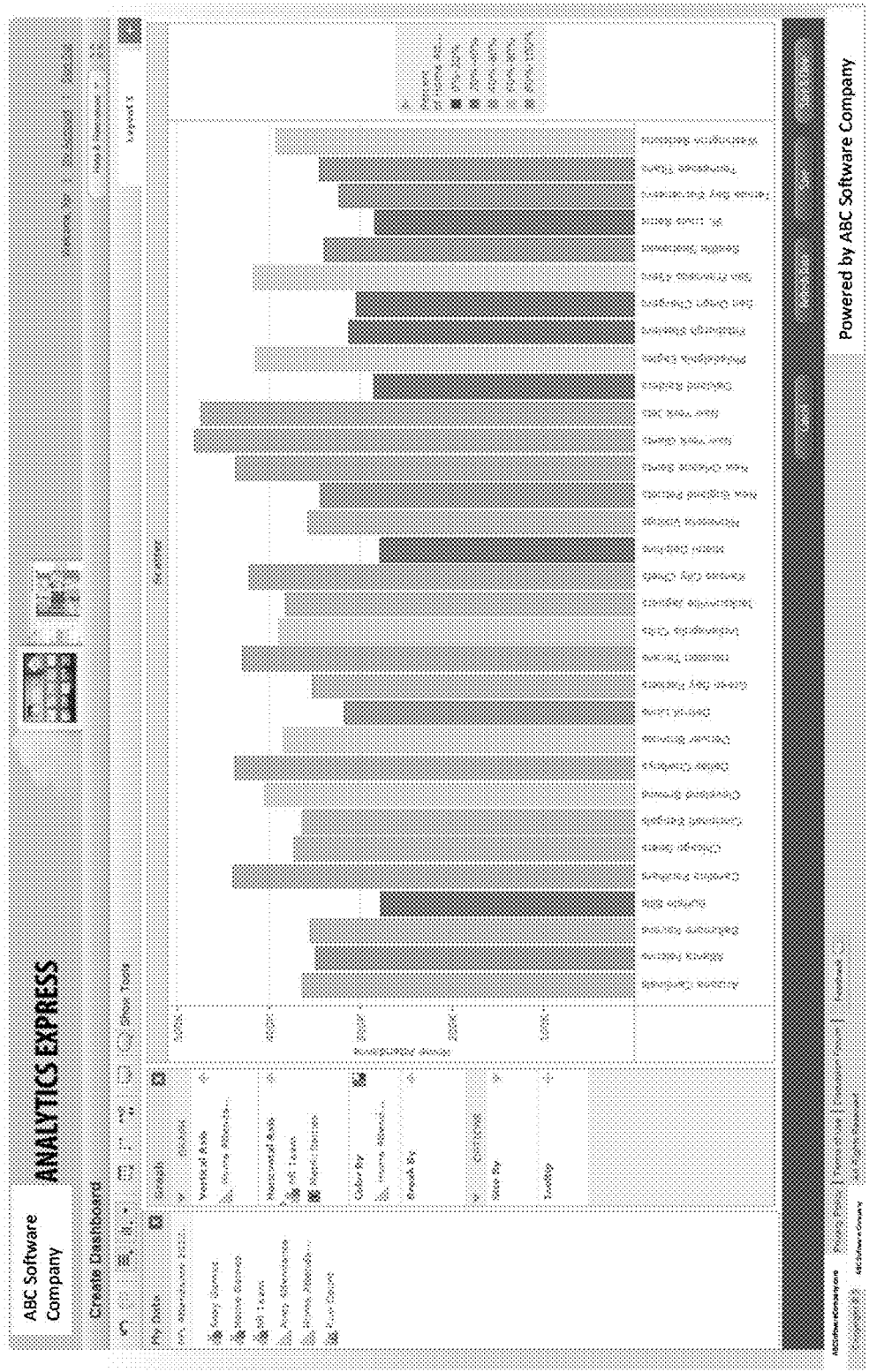
Figure 15:
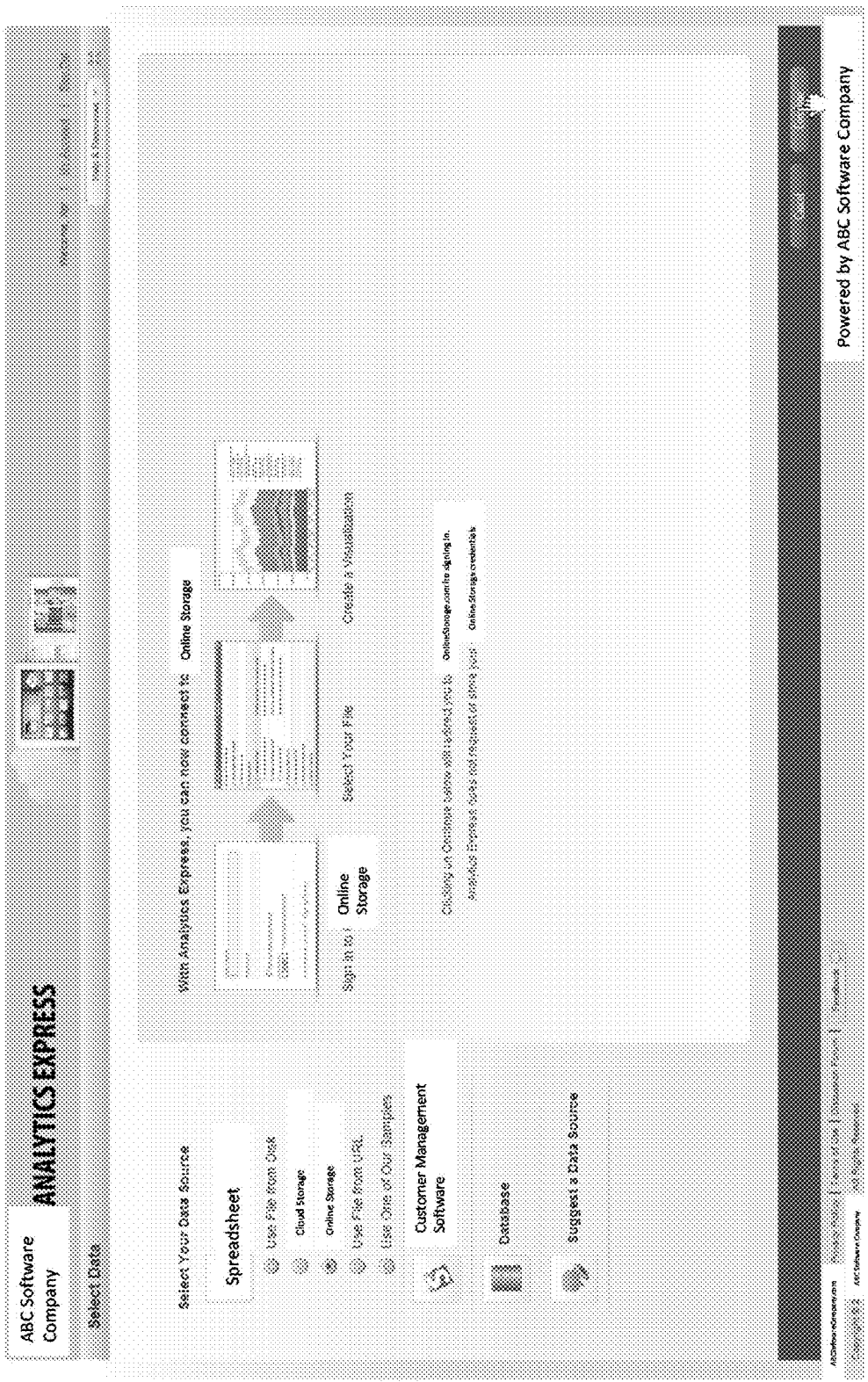
FIGS. 15-24 are exemplary user interfaces of an intelligence system accessing an Online Storage third-party resource.
Figure 16:
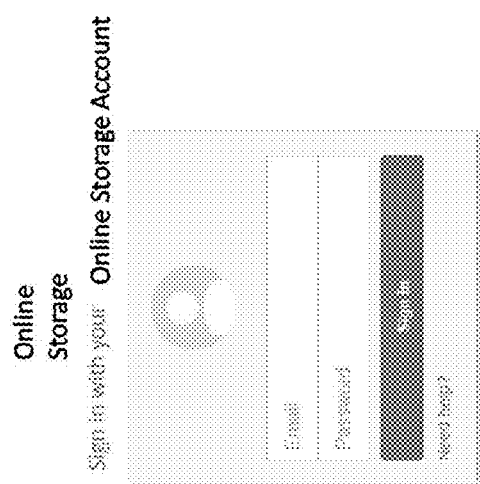
Figure 17:
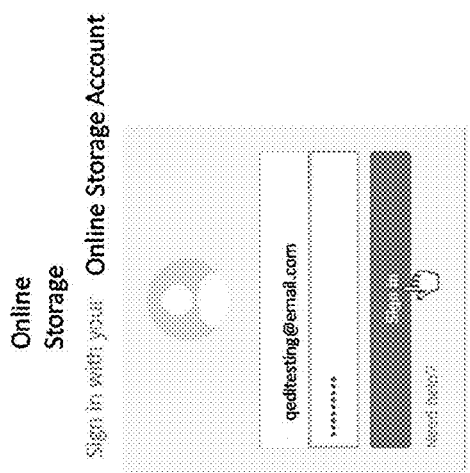
Figure 18:
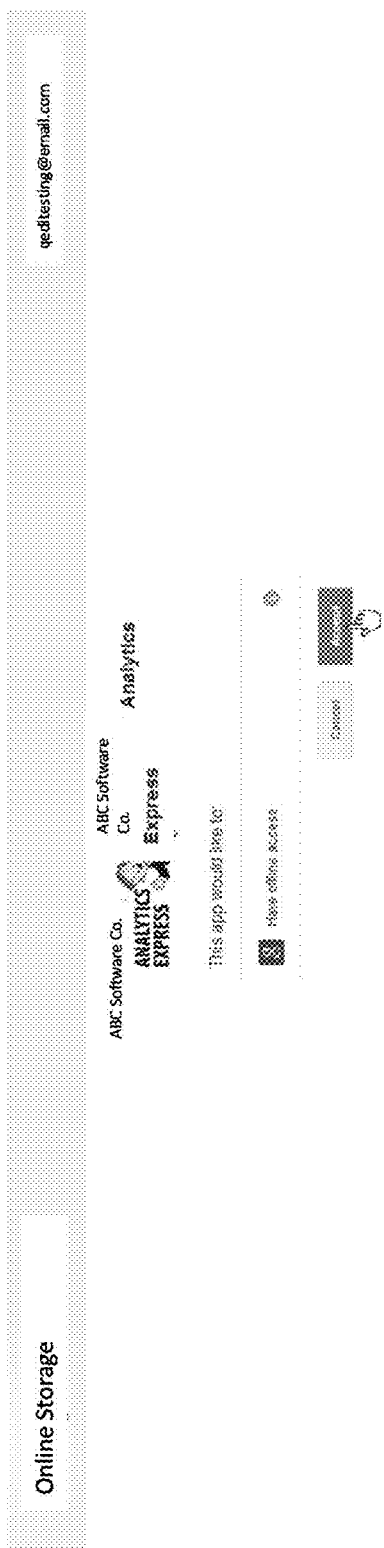
Figure 19:
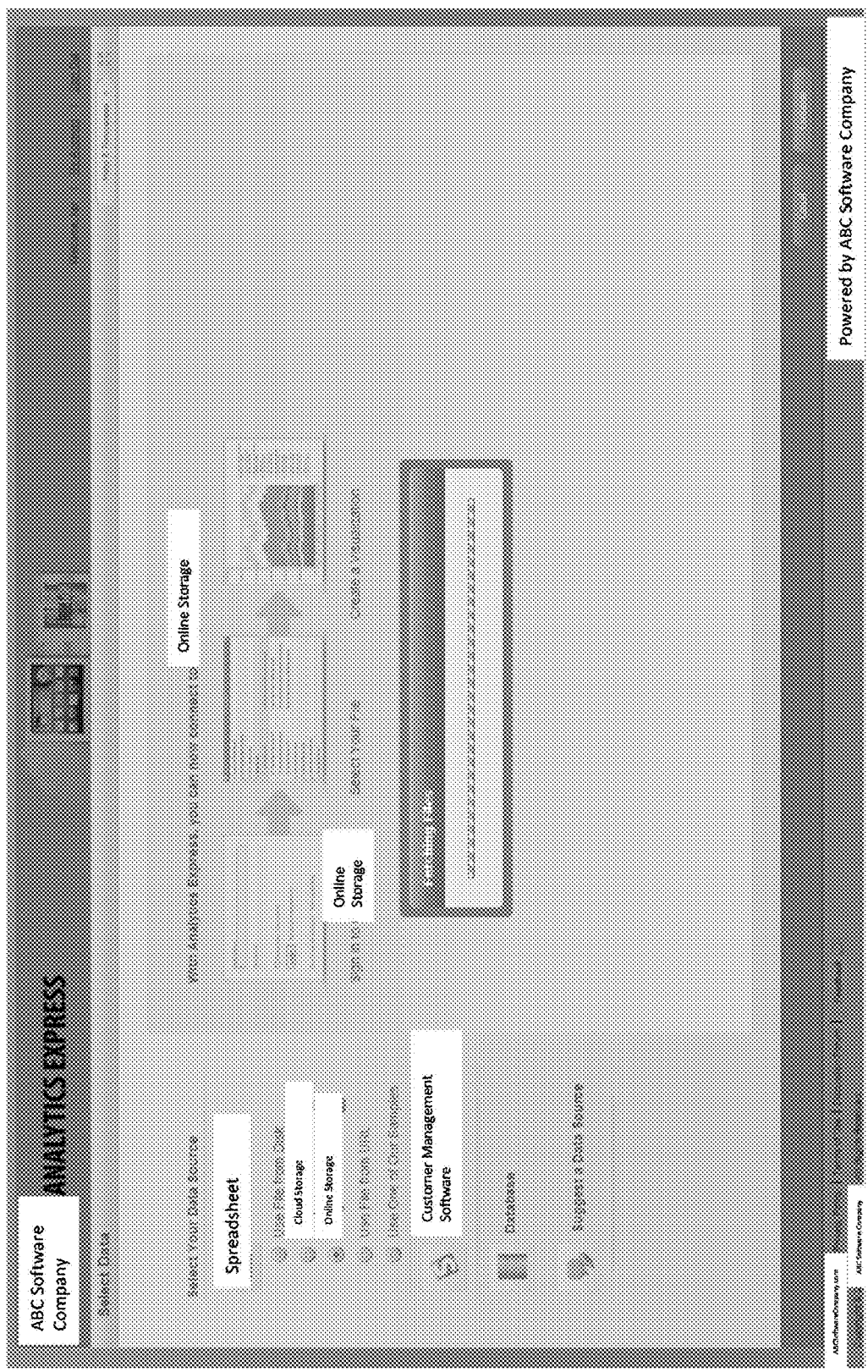
Figure 20:
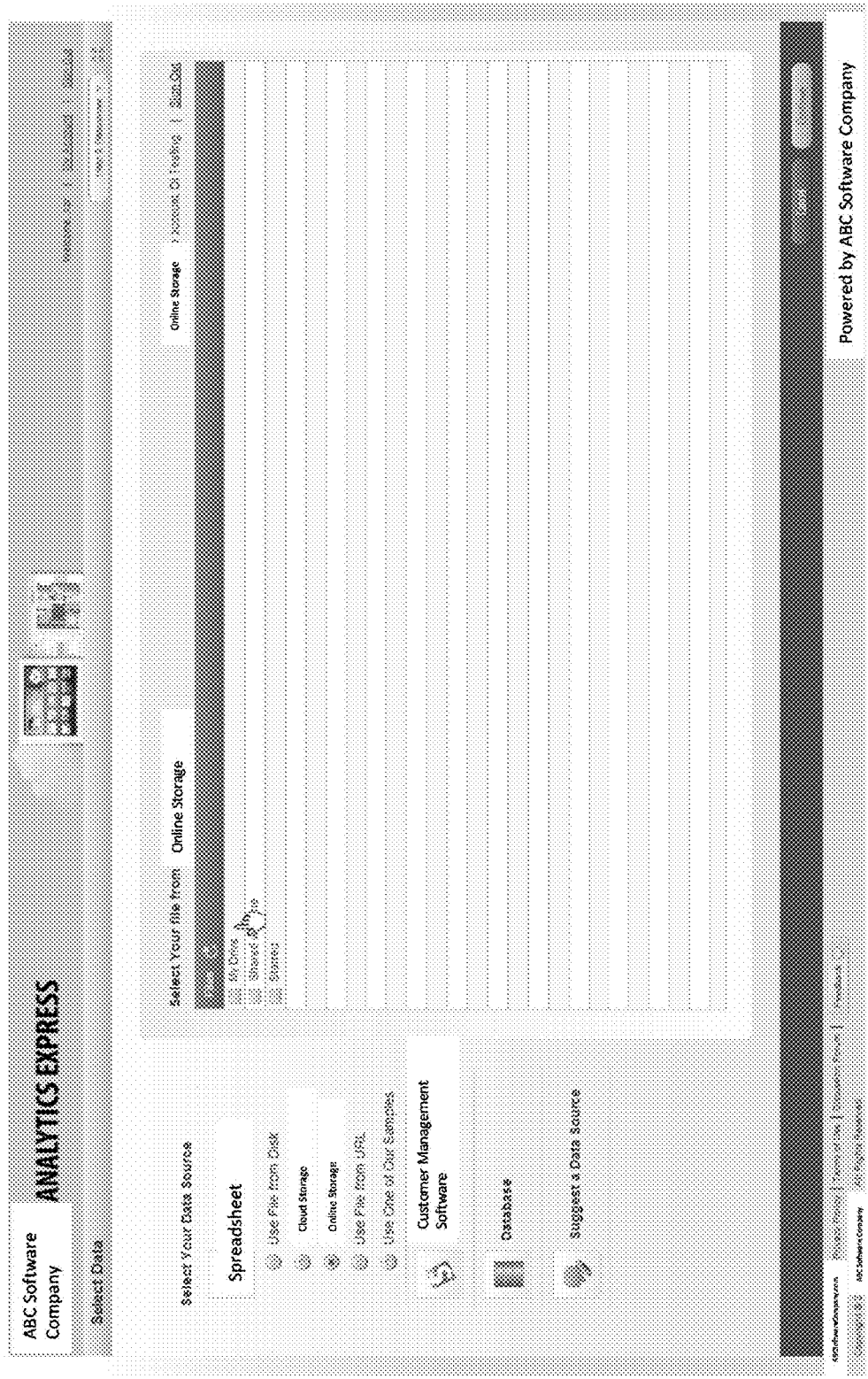
Figure 21:
Figure 22:
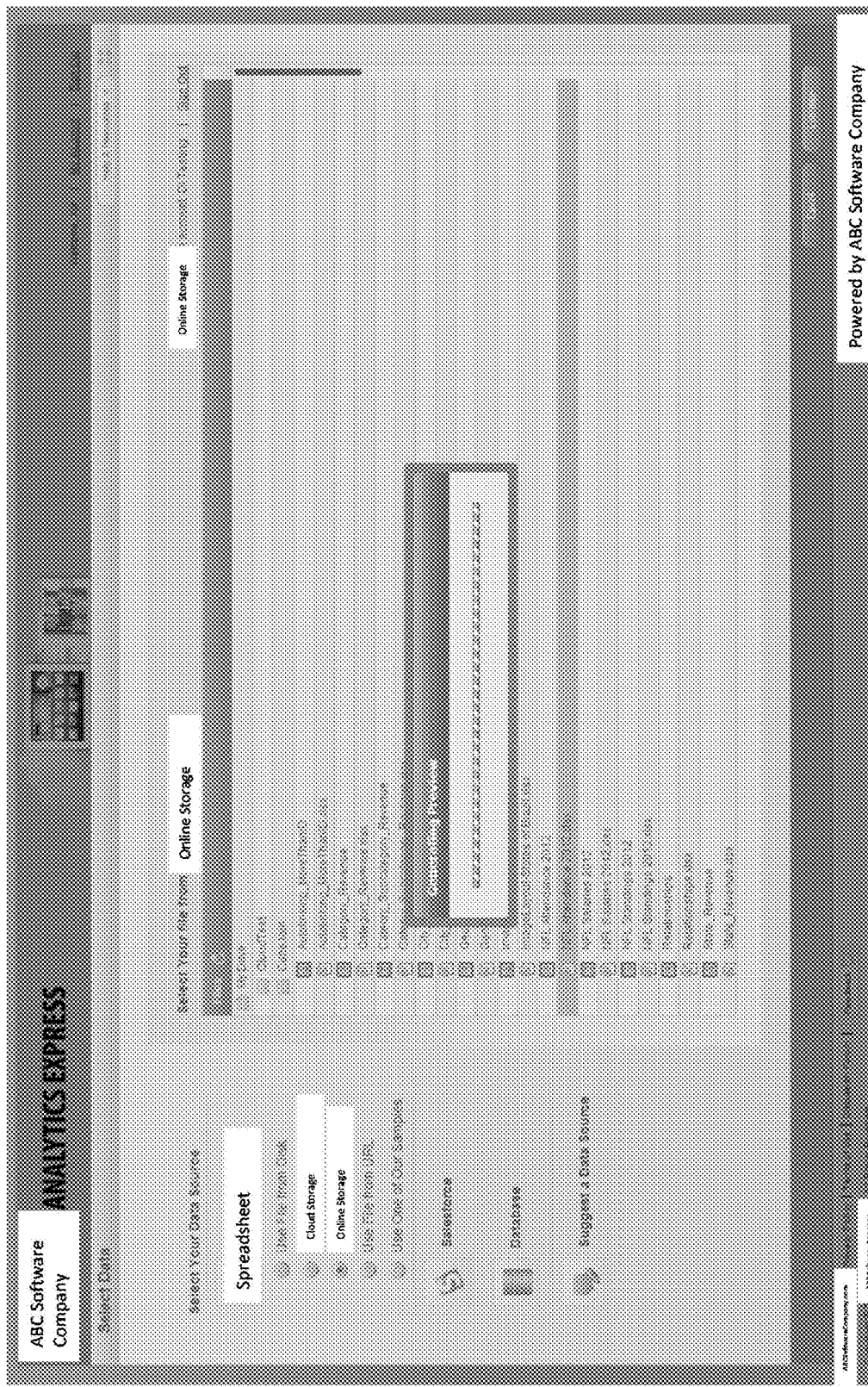
Figure 23:
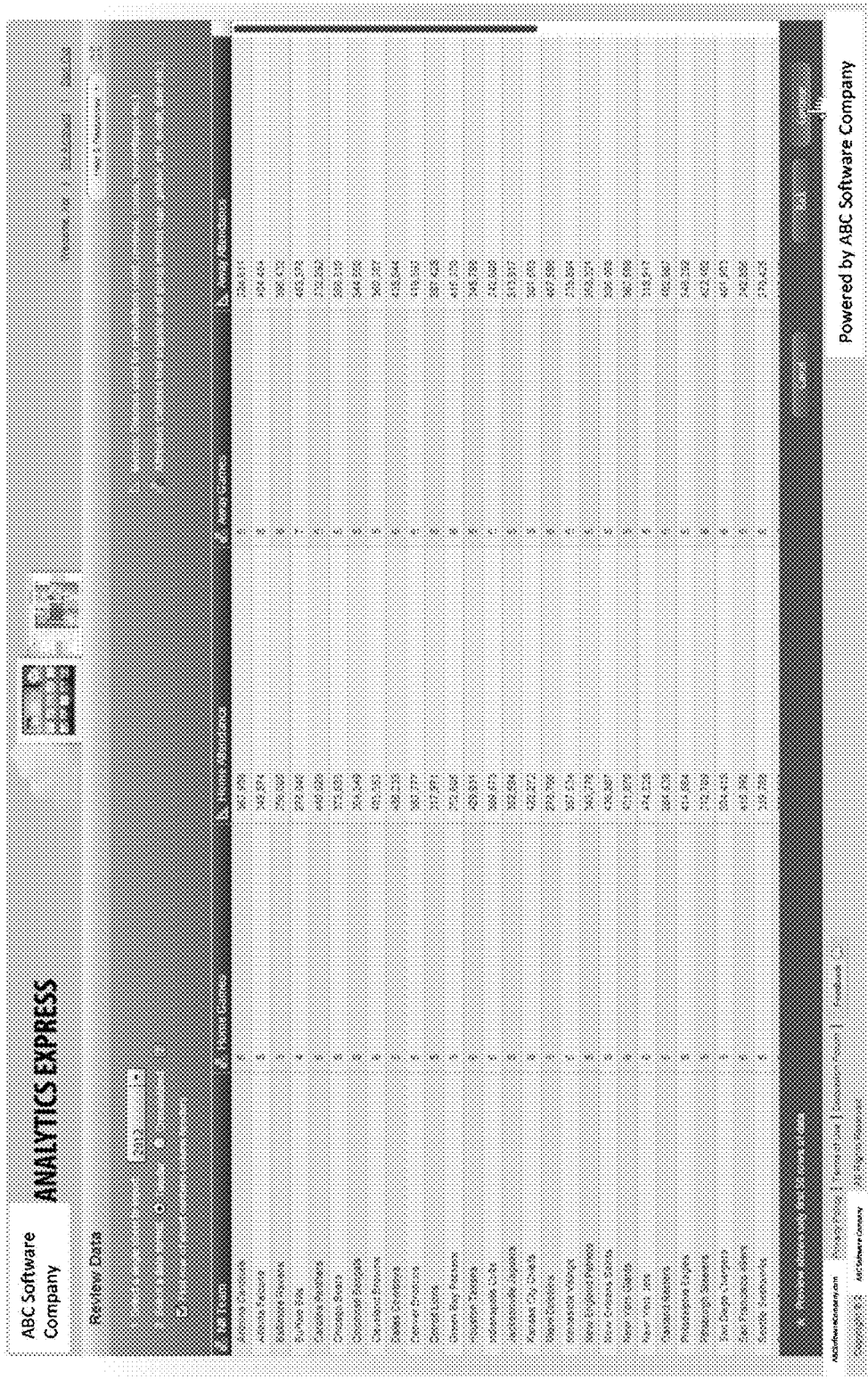
Figure 24:
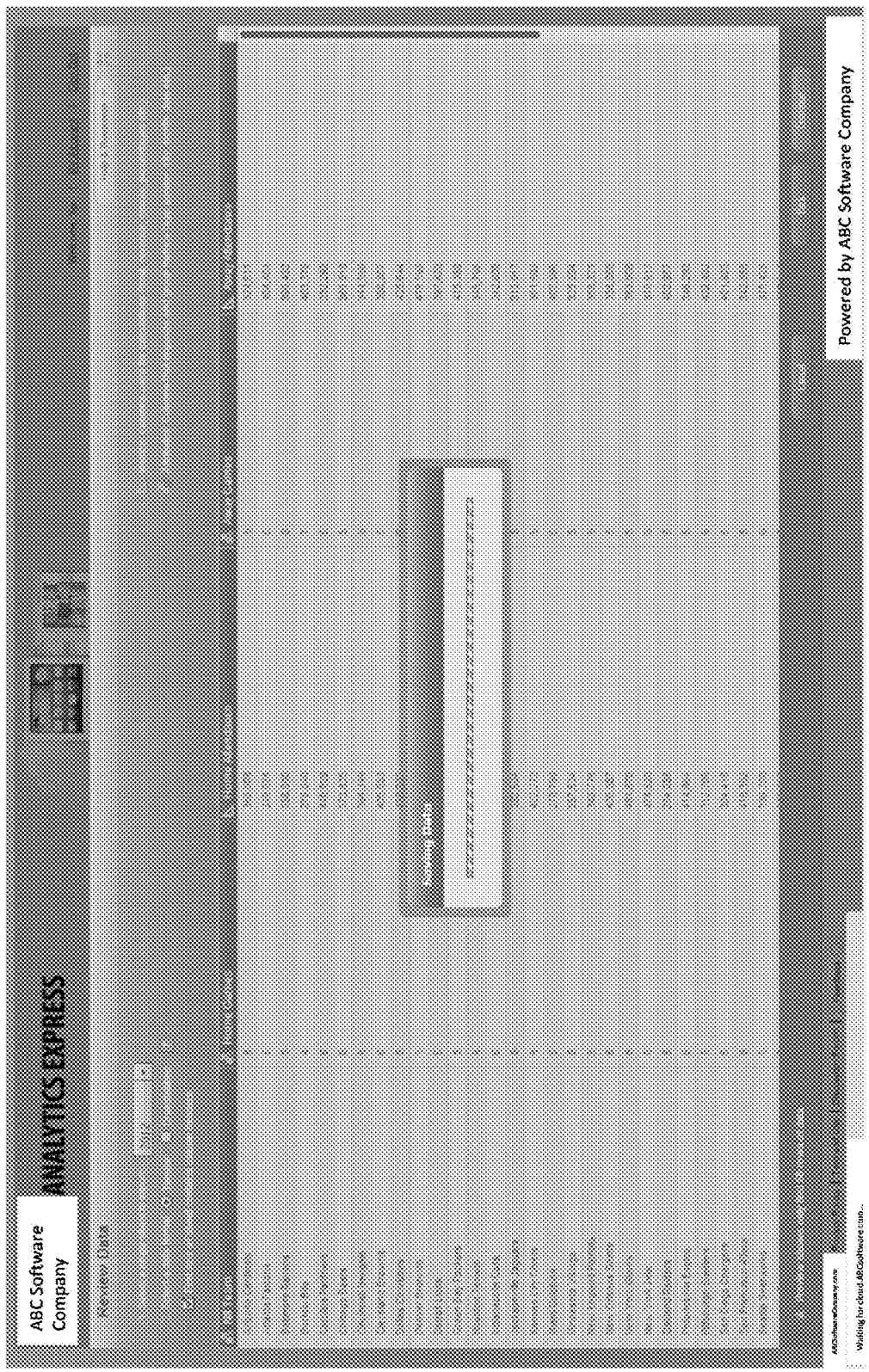
Figure 25:
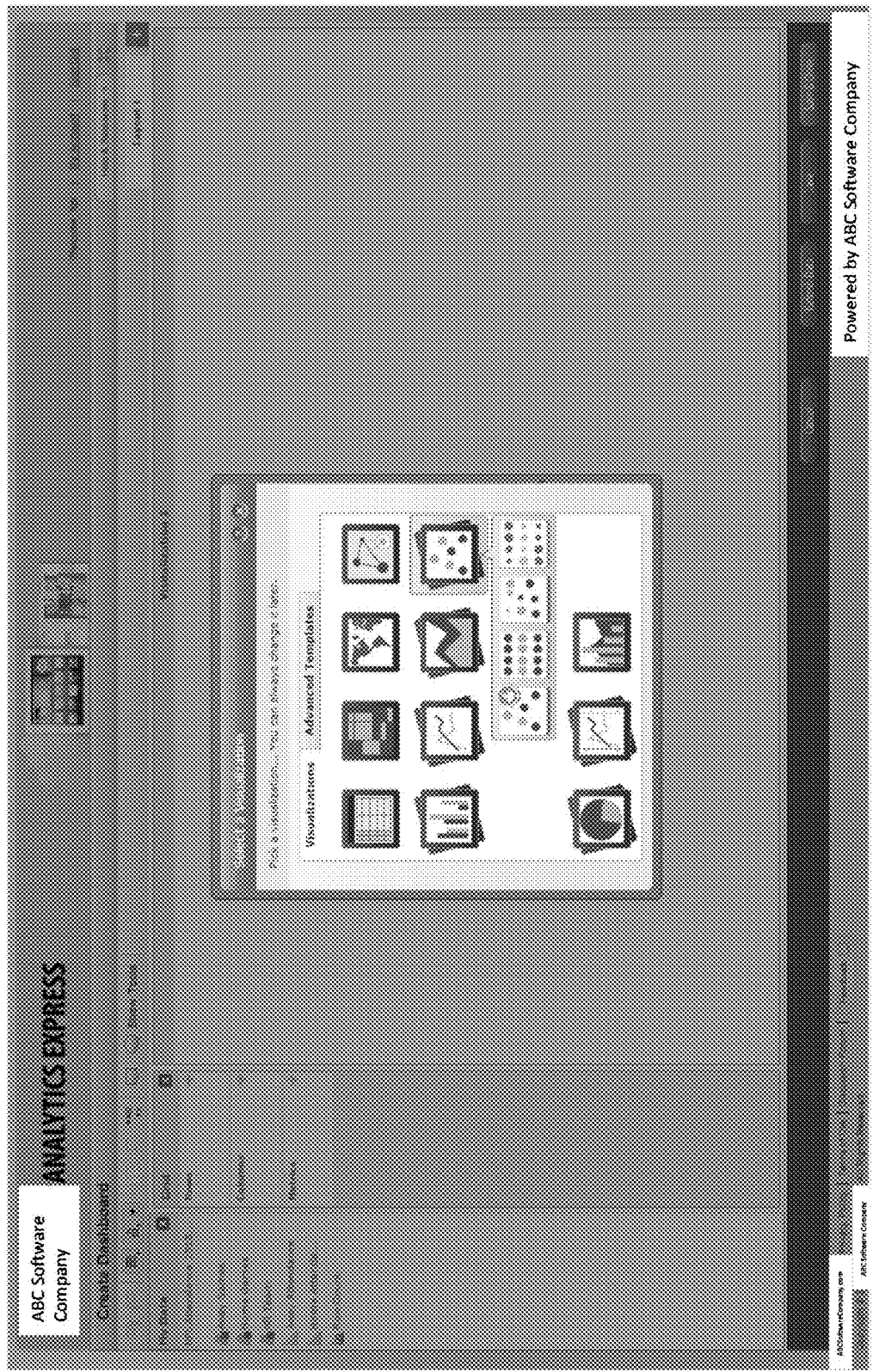
Figure 26:
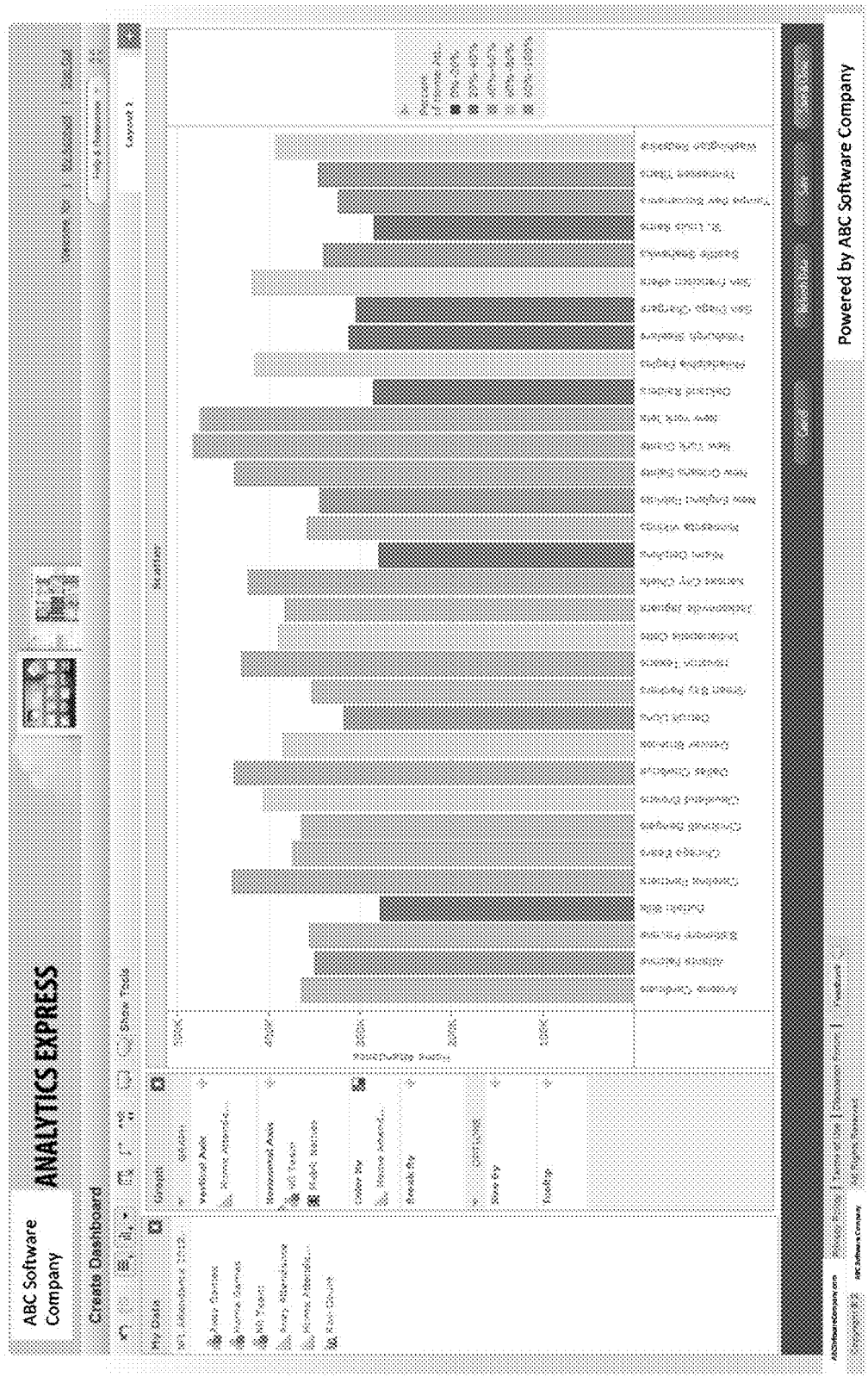

FIG. 6 is an example user interface for receiving permission from the user to access third-party resource by the IS. FIGS. 7-12 are example user interfaces for selecting data from the third-party resource for use by the IS. FIGS. 13 and 14 illustrate example user interfaces for selecting a visualization for the selected data from the third-party resource.

In some implementations, the IS may monitor user activity and detect when the user has terminated a user session for accessing a third-party resource. When the user session is terminated, the IS may maintain the access token for accessing the third-party resource in the selected shard along with user identification information. During subsequent logins to the IS and to the third-party resource, the load balancer may direct access of a user to the same shard utilized by the user in a previous user IS session or an initial user IS session. The user may select the same third-party resource for access by the IS (S1015). The IS may determine if credentials for the third-party resource are cached (S1020), and upon determining that credentials for the third-party resource are cached, the IS may retrieve the cached credentials (S1060).

In some implementations, during subsequent logins to the IS and to the third-party resource, the load balancer may direct access of the user to a shard that is different from the shard utilized by the user in a previous user IS session or an initial user IS session.

FIGS. 15-24 are example user interfaces of the IS accessing a different third-party resource, namely "Online Storage." As illustrated in FIGS. 7-12 and 15-24, accessing a third-party resource may include one or more of several operations. For example, accessing a third-party resource may include: fetching one or more files, folders, and/or directories from a third-party resource; modifying by removing, adding, or changing data stored in a third-party resource; displaying data obtained from the third-party resource in any suitable manner through a graphical user interface; and obtaining the third-party resource to communicate or transmit the obtained data to a destination, such as another entity, person, machine, or computer.

Figure 27:
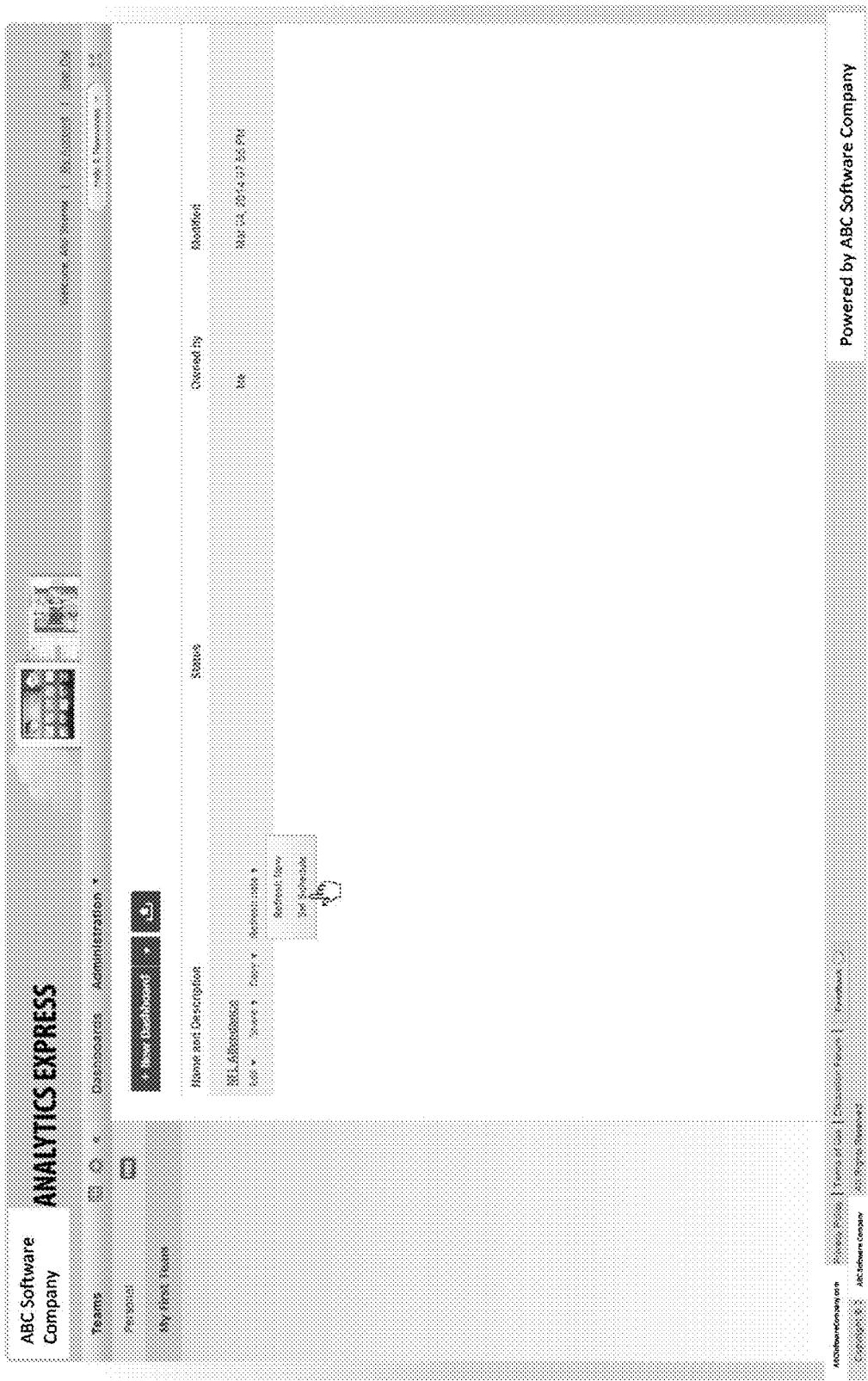
FIGS. 27 and 28 are exemplary user interfaces for selecting a refresh schedule for the selected visualization of the data shown in FIGS. 13, 14, 25, and 26.
Figure 28:
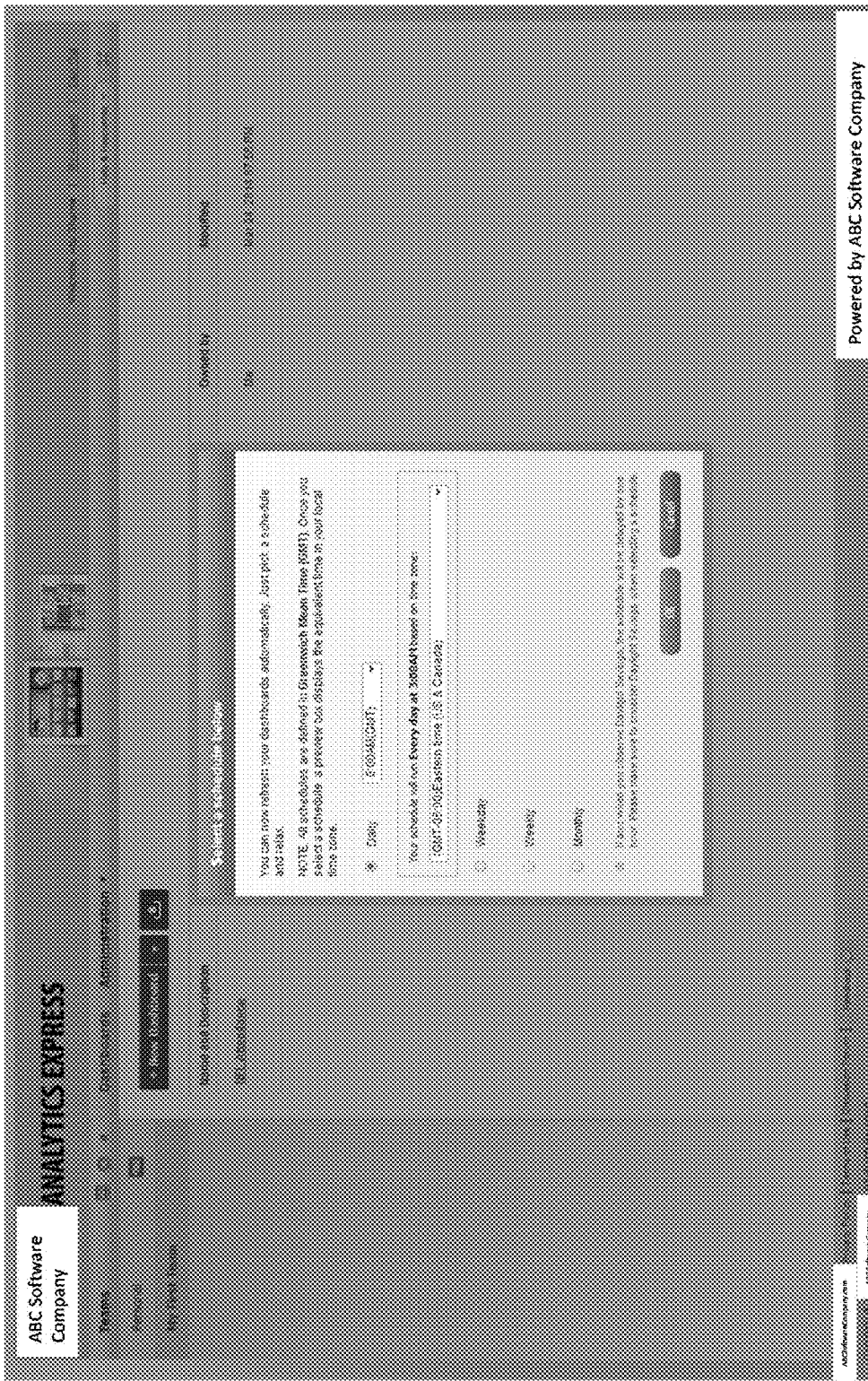

FIGS. 27 and 28 are example user interfaces for selecting a refresh schedule for the selected visualization of the data in FIGS. 13, 14, 25, and 26. As shown in FIGS. 27 and 28, the user may select a schedule to refresh a selected visualization with data from one or more third-party resources. In some implementations, the user may select a refresh schedule according to a periodic time interval (e.g., once per day, week, month or year). If a refresh schedule is selected, the IS will generate a request to access a third-party resource according to the scheduled time, and access data from the third-party resource without the user providing credentials. The IS may fetch an access token from the third-party resource and connect to the third-party resource on behalf of the user to refresh the visualization. The visualization will be updated based on any changes to data obtained from the third-party resource. At any time, the user may revoke the ability of the IS to use the token to access the third-party resource. Subsequently, the IS would require the user to input the user's credentials to access the third-party resource, as described above.

Figure 29:
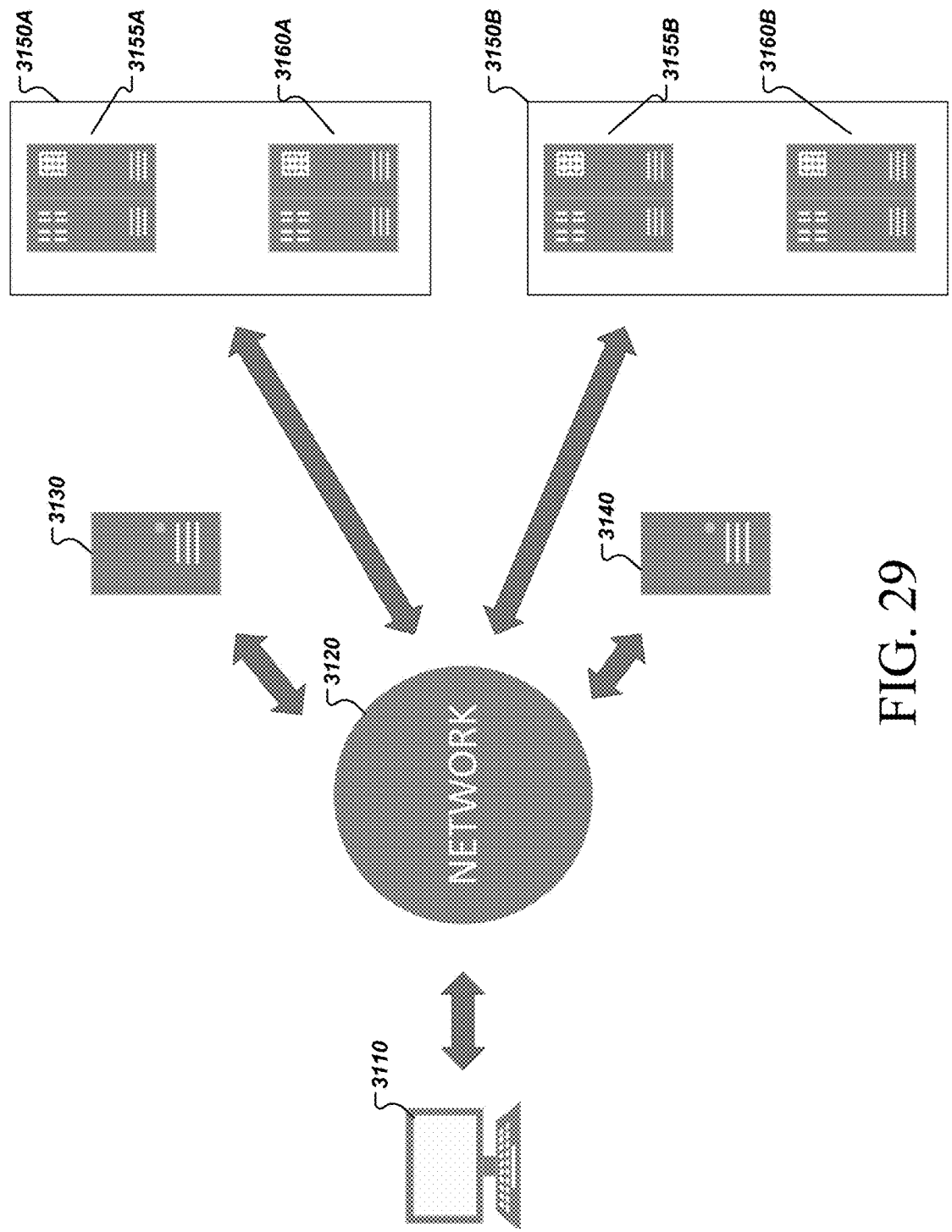
FIG. 29 depicts a block diagram of an exemplary intelligence system.

FIG. 29 depicts a block diagram of an exemplary IS. The IS may include a user device 3110, a network 3120, a token repository 3130, one or more additional databases 3140, and one or more shards 3150A/3150B. Each shard 3150A/3150B may include a web server 3155 and an intelligence server 3160.

The user device 3110 can be used to provide a user access to the IS. Examples of the user device include, but are not limited to, a computer, lap top, personal digital assistant, electronic pad, electronic notebook, telephone, smart phone, television, smart television, a watch, smart glasses, or any other suitable electronic device that is connected to a network. The user device 3110 may be connected to the network 3120, and may access the IS through the Internet. In some cases, the user device 3110 may have an executable IS application, software, or process installed. The user device 3110 can communicate with one or more shards 3150A/3150B through network 3120.

Although FIG. 29 illustrates one network 3120, it should be understood that network 3120 may include one or more networks. These one or more networks may provide network access, data transport, and other services between the various elements of the IS. In general, the one or more networks may include and implement any commonly defined network architectures including those defined by standards bodies, such as the Global System for Mobile communication (GSM) Association, the Internet Engineering Task Force (IETF), and the Worldwide Interoperability for Microwave Access (WiMAX) forum. For example, the one or more networks may implement one or more of a GSM architecture, a General Packet Radio Service (GPRS) architecture, a Universal Mobile Telecommunications System (UMTS) architecture, and an evolution of UMTS referred to as Long Term Evolution (LTE). The one or more networks may implement a WiMAX architecture defined by the WiMAX forum or a Wireless Fidelity (WiFi) architecture. The one or more networks may include, for instance, a local area network (LAN), a wide area network (WAN), the Internet, a virtual LAN (VLAN), an enterprise LAN, a layer 3 virtual private network (VPN), an enterprise IP network, or any combination thereof.

The one or more networks may include various types of databases, access points, servers, storage systems, cloud systems, and modules. The one or more networks may include any suitable computing device coupled to the one or more networks, including but not limited to a personal computer, a server computer, a series of server computers, a mini computer, and a mainframe computer, or combinations thereof. As shown in FIG. 29, network 3120 may be connected to token repository 3130 and one or more additional databases 3140. In some implementations, the token repository 3130 and one or more additional databases 3140 may be part of the network 29. Servers of network 3120 may run a network operating system, examples of which may include but are not limited to Microsoft® Windows® Server, Novell® NetWare®, or Linux®. The servers may also be used for and/or provide cloud and/or network computing. Although not shown in the figures, the server may have connections to external systems providing messaging functionality such as e-mail, SMS messaging, text messaging, and other functionalities, such as advertising services, search services, etc.

The token repository 3130 may include one or more databases and one or more storage systems for storing third-party resource access tokens, which provide access to the respective third-party resources. The access tokens may be OAuth access tokens or any other type of access tokens. In some implementations, the token repository may also store user data associated with users of the IS. The user data may include information provided by the user when registering as a user of the IS. This information may include biometric, demographic, personal and non-personal information of the user. In some implementations, the token repository stores a mapping table. The mapping table may be a database that provides the two-level mapping described above, and may map user identification information with one or more of credentials for accessing a third-party resource, and information identifying a shard selected for a user IS session. The user identification information may include user IS login and password information and/or the information provided by the user when registering as a user of the IS.

In some implementations, the mapping table also includes, for each third-party resource access token, an expiration time threshold indicating a time or time period for which the third-party resource access token can be used to access the third-party resource. In some cases, upon the expiration time threshold being satisfied (e.g., the time or time period for which the third-party resource access token can be used to access the third-party resource, has been reached or met), the third-party resource access token is removed from the token repository. In some cases, upon the expiration time threshold being satisfied, access to the third-party resource is revoked for the user. A message may be transmitted to the user device 3110 to indicate that access to the third-party resource for the user has been revoked and/or that the user is no longer authorized to access the third-party resource.

As described above, access to the third-party resource may be revoked due to, for example, a user requesting that the access be revoked or the expiration time threshold for an access token expiring. It should be understood that access to the third-party resource may also be revoked for other reasons. For instance, in some implementations, if changes in the user's IS credentials occur, access to a third-party resource may be revoked. In some implementations, if an access token for a third-party resource is changed, access to the third-party resource may be revoked. In some implementations, when reports of suspicious activities associated with a third-party resource or user are received, the IS may revoke access to the third-party resource. The suspicious activities may include, for example, data or security breaches and fraudulent behavior (e.g., hacker-like or compromised system behaviors) associated with the third-party resource or the user. When access to a third-party resource is revoked, any access token for the third-party resource is removed from the token repository 3130 and any access token for the third-party resource cached in the plurality of shards 3150A and 3150B of the IS is removed. Furthermore, information in the mapping table utilized to provide access to the third-party resource may be removed. For example, a mapping of the third-party resource access token to user identification information and a shard may be removed from the mapping table in response to revocation of access to the third-party resource. Information, such as an expiration time threshold associated with an access token for a third-party resource and a shard having a cached access token, may also be removed from the mapping table and token repository 3130 in response to revocation of access to the third-party resource.

The one or more databases 3140 may include any suitable type of database, including a cloud database or a database managed by a database management system (DBMS). The DBMS may be implemented as an engine that controls organization, storage, management, and retrieval of data in a database. DBMSs frequently provide the ability to query, backup and replicate, enforce rules, provide security, do computation, perform change and access logging, and automate optimization. The DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. Data structures can include fields, records, files, objects, and any other applicable known or convenient structures for storing data. The DBMS may also include, in a metadata database, metadata about the data that is stored.

Each of the one or more shards 3150A/3150B is a physical or virtual machine cluster that runs at least two instances of IS web servers 3155A/3155B and at least two instances of IS intelligence servers 3160A/3160B. The IS web servers 3155A/3155B and IS intelligence servers 3160A/3160B are connected to the one or more databases 3140 and the token repository 3130 through network 3120. The web servers 3155A/3155B may obtain an access token from a third-party resource using an OAuth process, and send the obtained access tokens to the IS intelligence servers 3160A/3160B in the same shard. The IS intelligence servers 3160A/3160B may implement automatic management of access tokens by using the token repository 3130. For example, the IS intelligence servers 3160A/3160B may cache an access token in the token repository 3130 for future access to a third-party resource, and may control mapping of the cached access token to corresponding user identification information. In some implementations, the IS intelligence servers 3160A/3160B may also communicate with the token repository 3130 to determine a list of user accounts.

In some implementations, each of the plurality of shards 3150A and 3150B may be designated to manage data for a particular third-party resource. Accordingly, data associated with the particular third-party resource is transceived through one shard. In this manner, third-party resources utilizing the IS may have independent shards, and data associated with one third-party resource cannot be utilized, manipulated, or accessed by or for another third-party resource. In some cases, data for a particular third-party resource may be transceived through multiple shards if a single shard is determined by a load balancer to have data traffic beyond a particular threshold or an access capacity that does not satisfy a particular access capacity threshold. In some implementations, an access token that provides access to a particular third-party resource may only be cached in one or more shards associated with the particular third-party resource. In some implementations, to enhance data security, an access token may only be cached in a shard if the shard is associated with a single third-party resource. When access to the particular third-party resource is revoked, the IS may access the one or more shards associated with the third-party resource to remove one or more access tokens that provide access to the particular third-party resource.

In some implementations, a shard 3150A/3150B may be designated to manage data for multiple third-party resources due to, for example, load balancing reasons. In such implementations, when the shard 3150A/3150B is utilized to access one of the multiple third-party resources, all access tokens may be removed from the cache of the shard 3150A/3150B until the shard 3150A/3150B is designated for a single third-party resource. The access token for the single third-party resource may then be retrieved from the token repository 3130 and cached in the shard 3150A/3150B.

Access tokens retrieved from the token repository 3130 can be used for all the shards 3150A and 3150B irrespective of the shard selected for a user. In some implementations, OAuth access tokens may be used to access multiple third-party resources.

In some implementations, the total number of IS users may be divided by the number of shards in the IS and assigned to each shard respectively so that data in the IS may be managed in an efficient and equally distributed manner. For example, if data for 100,000 IS users is being handled by 10 shards, each shard may manage data associated with 10,000 users. When multiple authorized users utilizing the same shard would like to access the same data from a particular third-party resource at the same or different times, the shard may share the user-desired data obtained from a third-party resource with the multiple users at the same time or at different times and does not have to request the third-party resource for data multiple times. In some implementations, multiple shards may be selected to manage data being requested by a user. For example, a user may request data from multiple third-party resources. Accordingly, the IS may use multiple shards to provide the requested data to the user if the user is authorized to access the multiple shards.

In some implementations, each the plurality of shards 3150A and 3150B may be connected to a load balancer. The load balancer may determine how much data traffic is being handled by each shard and/or an access capacity of each shard. The load balancer may determine which shard to select for a user based on the determined data traffic and/or access capacity of each shard. For example, the load balancer may determine which shard among the plurality of shards 3150A and 3150B has an access capacity that satisfies a particular access capacity threshold. A shard that satisfies the access capacity threshold may be selected for a user by the IS. In some cases, a shard that satisfies the access capacity threshold by the largest margin is selected. In some cases, any shard that satisfies the access capacity threshold may be selected.

A number of implementations have been described hereinabove. It should however be understood that various modifications may be made without departing from the spirit and scope of the disclosure. For example, various forms of the flows shown in FIGS. 1A and 1B may be used, with steps re-ordered, added, or removed. Accordingly, other implementations are within the scope of the disclosure and claims.

In addition, although examples with reference to a "Cloud Storage" and "Online Storage" have been described hereinabove, it should be understood that the disclosed implementations may be utilized with various suitable third-party resources. A third-party resource may include any web-based service system, database, repository, or portion thereof that is not provided directly by or directly integrated into the IS. In some implementations, a third-party resource may include any system, database, or resource associated with a particular company or organization. As described above, third-party resources may be accessed by access tokens.

Implementations and all of the functional operations and/or actions described in this specification may be implemented in digital electronic circuitry, or in computer software, firmware, or hardware, including the structures disclosed in this specification and their structural equivalents, or in combinations of one or more of them. Implementations may be implemented as one or more computer program products, e.g., one or more modules of computer program instructions encoded on a computer-readable medium for execution by, or to control the operation of, data processing apparatus. The computer-readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform the actions described herein. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Moreover, a computer may be embedded in another device, e.g., a tablet computer, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT), liquid crystal display (LCD), or light emitting diode (LED) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Thus, particular implementations have been described. Other implementations are within the scope of the following claims. For example, the actions recited in the claims may be performed in a different order and still achieve desirable results.

What is claimed is:

1. A computer-implemented method comprising:
receiving user identification information identifying a user for providing user access to a plurality of third-party resources;
selecting, from a plurality of shards by one or more computing devices, a shard in response to receiving the user identification information;
storing, in a token repository by the one or more computing devices, a mapping of information identifying the selected shard to the user identification information identifying the user;
receiving a request to access a particular third-party resource of the plurality of third-party resources without receiving, from the user, credentials for accessing the particular third-party resource;
in response to receiving the request to access the particular third-party resource without receiving, from the user, credentials for accessing the particular third-party resource, determining, by the one or more computing devices, whether the credentials for accessing the particular third-party resource are cached in the selected shard;
in response to determining that the credentials for accessing the particular third-party resource are cached in the selected shard, selecting, by the one or more computing devices, the credentials for accessing the particular third-party resource from among two or more credentials that are associated with the user and are stored in the selected shard, the credentials for accessing the particular third-party resource comprising a third-party resource access token that provides access to the particular third-party resource; and
in response to determining that the credentials for accessing the particular third-party resource are not cached in the selected shard:
determining, by the one or more computing devices, whether information identifying accounts associated with the user is stored in the token repository that stores the mapping of the information identifying the selected shard to the user identification information identifying the user, the accounts associated with the user including (i) user account identification for each of the plurality of third-party resources; and (ii) credential information for accessing the plurality of third-party resources;
in response to determining that information identifying accounts associated with the user is stored in the token repository:
obtaining a list of stored accounts associated with the user from the information identifying accounts associated with the user stored in the token repository; and
obtaining, from the list of stored accounts associated with the user, the third-party resource access token that provides access to the particular third-party resource;
in response to determining that information identifying accounts associated with the user is not stored in the token repository:

obtaining, from the particular third-party resource by the one or more computing devices, the third-party resource access token that provides access to the particular third-party resource after the credentials for accessing the particular third party resource are received from the user and authenticated; and storing, as part of the mapping in the token repository, a mapping of the third-party resource access token to the user identification information identifying the user and the selected shard; and providing, by the one or more computing devices, access to the particular third-party resource for the user using the selected shard and the third-party resource access token that provides access to the particular third-party resource.

2. The computer-implemented method of claim 1, further comprising:

in response to determining that the information identifying accounts associated with the user is stored in the token repository:

caching, in the selected shard, the credentials including the third-party access token for accessing the particular third-party resource obtained from the token repository.

3. The computer-implemented method of claim 1, wherein selecting, from a plurality of shards, a shard comprises:

determining whether at least a portion of a shard is mapped to the user; and in response to determining that the at least the portion of the shard is mapped to the user, selecting the same portion of the shard for the user.

4. The computer-implemented method of claim 1, wherein selecting, from a plurality of shards, a shard comprises:

determining that a shard has an access capacity that satisfies a particular threshold; and selecting the shard that has the access capacity that satisfies the particular threshold.

5. The computer-implemented method of claim 1, wherein selecting, from a plurality of shards, a shard comprises:

determining that the user has been invited by a second user to access the particular third-party resource;

determining a shard that is mapped to the second user; and selecting, for the user, the shard that is mapped to the second user.

6. The computer-implemented method of claim 1, wherein receiving a request to access a third-party resource comprises one of:

receiving a request from the user to access the particular third-party resource; and receiving a request generated by a processor to access the particular third-party resource according to a determined schedule associated with the user.

7. The computer-implemented method of claim 1, wherein obtaining, from the particular third-party resource, the third-party resource access token that provides access to the particular third-party resource comprises:

executing an open authentication protocol with the particular third-party resource;

receiving, from the particular third-party resource, the third-party resource access token that provides access for the particular third-party resource;

storing the received third-party resource access token in the token repository; and caching the received third-party resource access token in the selected shard.

8. The computer-implemented method of claim 1, wherein providing access to the particular third-party resource comprises:

obtaining data associated with the user from the particular third-party resource; and generating a graphical user interface configured to display at least a portion of the obtained data.

9. The computer-implemented method of claim 1, further comprising:

receiving data indicating that access, for the user, to the particular third-party resource is revoked; and in response to receiving the data indicating that access, for the user, to the particular third-party resource is revoked, transmitting a message indicating that the user is not authorized to access the particular third-party resource.

10. The computer-implemented method of claim 1, wherein:

the stored mapping includes an expiration time threshold of the third-party resource access token;

the third-party resource access token provides access to all third-party resources associated with the user; and each shard in the plurality of shards is configured to process data transceived to and from a different third-party resource.

11. The computer-implemented method of claim 10, further comprising:

revoking access of the user to the particular third-party resource in response to determining that a time duration of user access to the particular third-party resource satisfies the expiration time threshold of the third-party resource access token.

12. The computer-implemented method of claim 1, further comprising:

determining whether a user session for accessing the particular third-party resource has been terminated; and in response to determining that the user session for accessing the particular third-party resource has been terminated, maintaining, in a cache of the selected shard, the third-party resource access token.

13. A system comprising:

one or more computers and one or more storage devices storing instructions that are operable and when executed by one or more computers, cause the one or more computers to perform actions comprising:

receiving user identification information identifying a user for providing user access to a plurality of third-party resources;

selecting, from a plurality of shards, a shard in response to receiving the user identification information;

storing, in a token repository, a mapping of information identifying the selected shard to the user identification information identifying the user;

receiving a request to access a particular third-party resource of the plurality of third-party resources without receiving, from the user, credentials for accessing the particular third-party resource;

in response to receiving the request to access the particular third-party resource without receiving, from the user, credentials for accessing the particular third-party resource, determining whether the credentials for accessing the particular third-party resource are cached in the selected shard;

in response to determining that the credentials for accessing the particular third-party resource are cached in the selected shard, selecting the credentials for accessing the particular third-party resource from among two or more credentials that are associated with the user and are stored in the selected shard, the credentials for accessing the particular third-party resource comprising a third-party resource access token that provides access to the particular third-party resource; and in response to determining that the credentials for accessing the particular third-party resource are not cached in the selected shard:

determining whether information identifying accounts associated with the user is stored in the token repository that stores the mapping of the information identifying the selected shard to the user identification information identifying the user, the accounts associated with the user including (i) user account identification for each of the plurality of third-party resources; and (ii) credential information for accessing the plurality of third-party resources in response to determining that information identifying accounts associated with the user is stored in the token repository:

obtaining a list of stored accounts associated with the user from the information identifying accounts associated with the user stored in the token repository; and obtaining, from the list of stored accounts associated with the user, the third-party resource access token that provides access to the particular third-party resource;

in response to determining that information identifying accounts associated with the user is not stored in the token repository:

obtaining, from the particular third-party resource, the third-party resource access token that provides access to the particular third-party resource after the credentials for accessing the particular third party resource are received from the user and authenticated; and storing, as part of the mapping in the token repository, a mapping of the third-party resource access token to the user identification information identifying the user and the selected shard; and providing access to the particular third-party resource for the user using the selected shard and the third-party resource access token that provides access to the particular third-party resource.

14. The system of claim 13, wherein:
the stored mapping includes an expiration time threshold of the third-party resource access token;
the third-party resource access token provides access to all third-party resources associated with the user; and
each shard in the plurality of shards is configured to process data transceived to and from a different third-party resource.

15. The system of claim 13, wherein the actions further comprise:
in response to determining that the information identifying accounts associated with the user is stored in the token repository:
caching, in the selected shard, credentials including the third-party access token for accessing the particular third-party resource obtained from the token repository.

16. The system of claim 13, wherein:
selecting, from a plurality of shards, a shard comprises selecting a shard based on one of a user mapped portion of shard, an access capacity, an invitation by another user;
selecting the shard based on the user mapped portion of the shard comprises:
determining whether at least a portion of a shard is mapped to the user; and
in response to determining that the at least the portion of the shard is mapped to the user, selecting the same portion of the shard for the user;
selecting the shard based on the access capacity comprises:
determining that a shard has an access capacity that satisfies a particular threshold; and
selecting the shard that has the access capacity that satisfies the particular threshold; and
selecting the shard based on the invitation by another user comprises:
determining that the user has been invited by a second user to access the particular third-party resource;
determining a shard that is mapped to the second user; and
selecting, for the user, the shard that is mapped to the second user.

17. One or more non-transitory computer-readable storage media comprising instructions, which, when executed by one or more computers, cause the one or more computers to perform actions comprising:
receiving user identification information identifying a user for providing user access to a plurality of third-party resources;
selecting, from a plurality of shards, a shard in response to receiving the user identification information;
storing, in a token repository, a mapping of information identifying the selected shard to the user identification information identifying the user;
receiving a request to access a particular third-party resource of the plurality of third-party resources without receiving, from the user, credentials for accessing the particular third-party resource;
in response to receiving the request to access the particular third-party resource without receiving, from the user, credentials for accessing the particular third-party resource, determining whether the credentials for accessing the particular third-party resource are cached in the selected shard;
in response to determining that the credentials for accessing the particular third-party resource are cached in the selected shard, selecting the credentials for accessing the particular third-party resource from among two or more credentials that are associated with the user and are stored in the selected shard, the credentials for accessing the particular third-party resource comprising a third-party resource access token that provides access to the particular third-party resource; and
in response to determining that the credentials for accessing the particular third-party resource are not cached in the selected shard:
determining whether information identifying accounts associated with the user is stored in the token repository that stores the mapping of the information identifying the selected shard to the user identification information identifying the user, the accounts associated with the user including (i) user account identification for each of the plurality of third-party resources; and (ii) credential information for accessing the plurality of third-party resources;

in response to determining that information identifying accounts associated with the user is stored in the token repository:
- obtaining a list of stored accounts associated with the user from the information identifying accounts associated with the user stored in the token repository; and
- obtaining, from the list of stored accounts associated with the user, the third-party resource access token that provides access to the particular third-party resource;

in response to determining that information identifying accounts associated with the user is not stored in the token repository:
- obtaining, from the particular third-party resource, the third-party resource access token that provides access to the particular third-party resource after the credentials for accessing the particular third party resource are received from the user and authenticated; and
- storing, as part of the mapping in the token repository, a mapping of the third-party resource access token to the user identification information identifying the user and the selected shard; and providing access to the particular third-party resource for the user using the selected shard and the third-party resource access token that provides access to the particular third-party resource.

18. The one or more non-transitory computer-readable storage media of claim 17, wherein:
- the stored mapping includes an expiration time threshold of the third-party resource access token;
- the third-party resource access token provides access to all third-party resources associated with the user; and
- each shard in the plurality of shards is configured to process data transceived to and from a different third-party resource.

19. The one or more non-transitory computer-readable storage media of claim 17, wherein the actions further comprise:
- in response to determining that the information identifying accounts associated with the user is stored in the token repository:
  - caching, in the selected shard, credentials including the third-party access token for accessing the particular third-party resource obtained from the token repository.

20. The one or more non-transitory computer-readable storage media of claim 17, wherein:
- selecting, from a plurality of shards, a shard comprises selecting a shard based on one of a user mapped portion of shard, an access capacity, an invitation by another user;
- selecting the shard based on the user mapped portion of the shard comprises:
  - determining whether at least a portion of a shard is mapped to the user; and
  - in response to determining that the at least the portion of the shard is mapped to the user, selecting the same portion of the shard for the user;
- selecting the shard based on the access capacity comprises:
  - determining that a shard has an access capacity that satisfies a particular threshold; and
  - selecting the shard that has the access capacity that satisfies the particular threshold; and
- selecting the shard based on the invitation by another user comprises:
  - determining that the user has been invited by a second user to access the particular third-party resource;
  - determining a shard that is mapped to the second user; and
  - selecting, for the user, the shard that is mapped to the second user.

* * * * *